(12) United States Patent
Pierce

(10) Patent No.: US 8,950,361 B1
(45) Date of Patent: *Feb. 10, 2015

(54) ORGANIC FISHERY SYSTEM HAVING CLEANING AND HEATING FEATURES

(71) Applicant: Casa Grande Fish Farms JV, LLC, Chandler, AZ (US)

(72) Inventor: Larry Pierce, Casa Grande, AZ (US)

(73) Assignee: Casa Grande Fish Farm JV, LLC, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,080

(22) Filed: Feb. 14, 2014

Related U.S. Application Data

(63) Continuation-in-part of application No. 12/829,645, filed on Jul. 2, 2010, now Pat. No. 8,651,058.

(51) Int. Cl.
*A01K 61/00* (2006.01)
*A01K 61/02* (2006.01)

(52) U.S. Cl.
CPC ............... *A01K 61/003* (2013.01); *A01K 61/00* (2013.01); *A01K 61/02* (2013.01)
USPC .......................................... 119/200; 119/228

(58) Field of Classification Search
CPC .... A01K 61/00; A01K 61/003; A01K 63/065
USPC .......... 119/200, 215, 226, 227, 228, 229, 232
See application file for complete search history.

(56) References Cited

U.S. PATENT DOCUMENTS

| | | | | |
|---|---|---|---|---|
| 3,324,829 | A * | 6/1967 | De Jose Guadalupe Dosamantes et al. | 119/262 |
| 4,401,576 | A * | 8/1983 | Meurer | 210/803 |
| 5,009,188 | A * | 4/1991 | Yasui | 119/253 |
| 5,278,941 | A * | 1/1994 | Ward | 392/498 |
| 5,772,885 | A * | 6/1998 | Sarrouh | 210/523 |
| 6,280,611 | B1 * | 8/2001 | Henkin et al. | 210/143 |
| 6,382,134 | B1 * | 5/2002 | Gruenberg et al. | 119/215 |
| 6,815,918 | B2 * | 11/2004 | Porat et al. | 318/568.12 |

* cited by examiner

*Primary Examiner* — Rob Swiatek
*Assistant Examiner* — Ebony Evans
(74) *Attorney, Agent, or Firm* — Weiss & Moy; Jeffrey D. Moy

(57) ABSTRACT

A system for organic farming of aquatic livestock has at least one substantially enclosed container structured and arranged to contain at least one input-controlled organic environment usable to organically farm such aquatic livestock. At least one pollutant-free water-supplier is structured and arranged to supply, to the at least one substantially enclosed container, water substantially free of environmental pollutants. At least one aquatic life-support unit is structured and arranged to maintain within the at least one substantially enclosed container habitable environment consistent with sustaining growth of such aquatic livestock. At least one heating system is coupled to the at least one substantially enclosed container for heating an air mixture. The air mixture is injected into the water substantially free of environmental pollutants to heat the water substantially free of environmental pollutants.

8 Claims, 12 Drawing Sheets

ORGANIC FISHERY SYSTEM HAVING CLEANING AND HEATING FEATURES

RELATED APPLICATIONS

The present application is a Continuation-In-Part of patent application Ser. No. 12/829,645, filed Jul. 2, 2010 which is related to and claims priority from prior provisional application Ser. No. 61/222,956, filed Jul. 3, 2009, entitled "ORGANIC FISHERY SYSTEMS"; and, is related to and claims priority from prior provisional application Ser. No. 61/248,396, filed Oct. 2, 2009, entitled "ORGANIC FISHERY SYSTEMS"; and, is related to and claims priority from prior provisional application Ser. No. 61/261,531, filed Nov. 16, 2009, entitled "ORGANIC FISHERY SYSTEMS", the contents of all of which are incorporated herein by this reference and are not admitted to be prior art with respect to the present invention by the mention in this cross-reference section.

BACKGROUND

This invention relates to providing a system for improved organic fishery systems. More particularly, this invention relates to providing a system for establishing fully organic aquatic farming, primarily within inland production sites.

Commercial farming of aquatic livestock has become an important source of protein-rich food for growing world populations. Conventional aquatic farms rely heavily on the use of chemicals to enable maximum production output. Conventional fisheries often treat the fish stock with synthetic growth hormones, antibiotics, dyes, etc., which eventually make their way to the end consumer.

Currently, no known commercial aquaculture production produces products using fully controlled "organic" production practices. The development of commercially-viable "organic" aquatic livestock farms, operated without the use of potentially-harmful chemicals, would be of great benefit to the industry and end-consumers alike.

SUMMARY

A primary object and feature of the present invention is to provide a system overcoming the above-mentioned problems.

It is a further object and feature of the present invention to provide such a system providing apparatus and methods enabling fully organic aquatic animal (livestock) production.

It is a another object and feature of the present invention to provide such a system providing on-site processing of the production harvest to facilitate on-site shipping of the product.

It is an additional object and feature of the present invention to provide such a system establishing one or more secondary on-site production activities producing secondary commercial outputs utilizing, in part, byproducts of the primary organic aquatic livestock production.

It is a further object and feature of the present invention to provide such a system providing a method of establishing a sustainably managed source of organic food useable in such organic aquatic livestock production.

It is another object and feature of the present invention to provide such a system organized to minimize the environmental impact of production byproducts on adjoining ecosystems.

A further primary object and feature of the present invention is to provide such a system that is efficient, inexpensive, and useful. Other objects and features of this invention will become apparent with reference to the following descriptions.

SUMMARY OF THE INVENTION

In accordance with a preferred embodiment hereof, this invention provides a method related to organic production of aquatic livestock comprising the steps of: establishing a production site for the organic farming of such aquatic livestock; providing within such production site, at least one enclosure structured and arranged to physically isolate at least one controlled aquatic environment from a surrounding environment; establishing within such at least one enclosure, such at least one controlled aquatic environment for the organic farming of such aquatic livestock; introducing within such at least one controlled aquatic environment at least one production population comprising the aquatic livestock; managing such at least one controlled aquatic environment in a manner consistent with the growth of such at least one production population and organic production practices; harvesting such at least one production population at the conclusion of a growth period; providing within such production site, at least one on-site processor to process, for off-site distribution, the at least one production population harvested from such at least one controlled aquatic environment; providing to at least one organic certification entity uninterrupted access to such production site during such organic production.

Moreover, it provides such a method further comprising the step of providing at least one on-site byproduct utilizer structured and arranged to utilize, substantially on site, at least one byproduct produced by the at least one aquatic livestock during such organic farming.

In accordance with another preferred embodiment hereof, this invention provides additionally, it provides such a method further comprising the initial steps of: establishing a plurality of controlled aquatic environments for the organic farming of such aquatic livestock; establishing within such plurality of controlled aquatic environments, at least one hatchery structured and arranged to produce at least one fry population of such aquatic livestock; producing from the at least one fry population, at least one substantially monosex production population consisting substantially of males; establishing within such plurality of controlled aquatic environments at least one grow-out enclosure structured and arranged to support the grow-out of such at least one substantially monosex production population; introducing such at least one substantially monosex production population within such at least one grow-out enclosure; managing such at least one grow-out enclosure to maintain a habitable environment consistent with the growth of such at least one substantially monosex production population and organic production practices; and harvesting such at least one substantially monosex production population at the conclusion of such growth period. Also, it provides such a method further comprising the intermediate step of physically removing from such at least one grow-out enclosure, progeny resulting from unintended occurrences of females within the at least one substantially monosex production population.

In addition, it provides such a method wherein the step of producing from the at least one fry population, at least one monosex production population comprises the step of physically sorting males from at least one mix-sex fry population. In accordance with another preferred embodiment hereof, this invention provides and, it provides such a method further comprising the initial step of providing at least one on-site electrical power source structured and arranged to provide on-site electrical power.

In accordance with another preferred embodiment hereof, this invention provides a system related to organic farming of aquatic livestock comprising: at least one substantially enclosed container structured and arranged to contain at least one input-controlled organic environment usable to organically farm such aquatic livestock; at least one pollutant-free water-supplier structured and arranged to supply, to such at least one substantially enclosed container, water substantially free of environmental pollutants; at least one aquatic life-support unit structured and arranged to maintain within such at least one substantially enclosed container a habitable environment consistent with the sustained growth of such aquatic livestock; wherein such at least one aquatic life-support unit comprises at least one aerator structured and arranged to aerate the water, and at least one toxic-compound remover structured and arranged to remove at least one toxic compound from the water within such at least one substantially enclosed container; wherein such at least one substantially enclosed container comprises at least one environmental isolator structured and arranged to substantially isolate at least one volume of the water from a surrounding terrestrial environment.

Further, it provides such a system wherein such at least one substantially enclosed container comprises: at least one containment wall structured and arranged to contain the water within such at least one substantially enclosed container; and at least one closeable access port structured and arranged to provide external access through such at least one outer containment wall to such at least one input-controlled organic environment. Even further, it provides such a system wherein such at least one aerator comprises at, least one air filter to filter the air prior to aeration of the water. Moreover, it provides such a system further comprising at least one gas exhauster structured and arranged to exhaust from such at least one water container gases discharged from the water contained therein.

In accordance with another preferred embodiment hereof, this invention provides additionally, it provides such a system wherein such at least one gas exhauster comprises at least one mechanical exhaust fan structured and arranged to exhaust such gases from such at least one substantially enclosed container. In accordance with another preferred embodiment hereof, this invention provides also, it provides such a system wherein: such at least one waste remover comprises at least one biological filter structured and arranged to biologically filter the at least one volume of such water; and such biological filter is structured and arranged to control levels of waste contaminants within the water through at least one biological process utilizing at least one bio-filtering microorganism.

In addition, it provides such a system further comprising: at least one water-circulation subsystem structured and arranged to circulate the at least one volume of such water between such at least one substantially enclosed tank and such biological filter; wherein such at least one water-circulation subsystem comprises at least one circulator pump structured and arranged to provide pump-assisted circulation the water within such at least one water-circulation subsystem.

In accordance with another preferred embodiment hereof, this invention provides and, it provides such a system wherein such at least one aerator further comprises at least one venturi-type air injector structured and arranged to inject the filtered air into the water using differential pressure generated by pump-assisted movement of the substantially pollutant-free water within such at least one water-circulation subsystem. Further, it provides such a system wherein such at least one aerator further comprises: at least one air-pump structured and arranged to pump the filtered air into the water at an elevated pressure; and in fluid communication with such at least one air-pump, at least one bubbler structured and arranged to form at least one dispersion of bubbles within the water. Even further, it provides such a system wherein: such at least one water container comprises a plurality of substantially enclosed tanks each one interconnected by such at least one water circulation subsystem; and such at least one water-circulation subsystem comprises at least one isolation valve structured and arranged to controllably isolate any one substantially enclosed tank from the remaining substantially enclosed tanks of such plurality.

Moreover, it provides such a system further comprising at least one on-site power source structured and arranged to produce electrical power to operate such at least one circulator pump, such at least one air-pump, and such at least one gas exhauster. In accordance with another preferred embodiment hereof, this invention provides additionally, it provides such a system wherein such at least one on-site power source is structured and arranged to produce such operable power substantially by the conversion of solar energy.

In accordance with another preferred embodiment hereof, this invention provides also, it provides such a system wherein such a least one on-site power source is structured and arranged to produce such operable power substantially by the conversion of wind energy. In addition, it provides such a system further comprising: at least one on-site product processor structured and arranged to process, substantially on-site, the aquatic livestock harvested from such at least one input-controlled organic environment; wherein such processing by such at least one on-site product processor assists off-site distribution of the aquatic livestock.

In accordance with another preferred embodiment hereof, this invention provides and, it provides such a system further comprising at least one on-site byproduct utilizer structured and arranged to utilize, substantially on site, at least one byproduct produced by the aquatic livestock during such organic farming. Further, it provides such a system wherein such at least one on-site byproduct utilizer comprises at least one surface crop structured and arranged to utilized at least one nitrogen-containing solid waste produced by the aquatic livestock as a fertilizer. Even further, it provides such a system wherein: such at least one on-site byproduct utilizer comprises at least one photosynthetic-organism cultivator structured and arranged to cultivate at least one photosynthetic-organism capable of yielding at least one lipid compound usable in the production of at least one biofuel; wherein such at least one photosynthetic-organism utilizes at least solid-waste produced by the aquatic livestock as a byproduct of such organic farming.

Even further, it provides such a system wherein such at least one photosynthetic-organism cultivator is structured and arranged to cultivate at least one algae. Even further, it provides such a system wherein such least one on-site byproduct utilizer comprises: at least one on-site secondary aquatic-product producer structured and arranged to produce, substantially onsite, at least one secondary aquatic product; wherein at least one secondary aquatic-product producer utilizes at least one protein byproduct of the aquatic livestock as a food nutrient for the at least one secondary aquatic product. Even further, it provides such a system wherein such least one on-site byproduct utilizer comprises: at least one organic fertilizer processor structured and arranged to produce at least one organic fertilizer from at least solid-waste produced by the aquatic livestock as a byproduct of such organic farming; wherein such at least one organic fertilizer processor comprises at least one dryer structured and arranged to dry the at least one organic fertilizer of residual water from such at least one input-controlled organic environment; and wherein such at least one dryer is structured and arranged to dry the at least one organic fertilizer using substantially solar energy.

In accordance with a preferred embodiment hereof, this invention provides a method, relating to the franchising of organic production of aquatic livestock, comprising the steps of: granting by at least one franchisor to at least one franchisee at least one franchise to operate at least one organic fishery with limited use of the names and marks associated with such operation; wherein such at least one franchisor provides to such at least one franchisee territorial rights to distribute, within at least one defined geographic region, organic products produced by such at least one organic fishery, assistance in the selection of at least one production site within such geographic region, assistance in the development of such at least one organic fishery within such at least one production site, assistance with the initial startup of production, prior to commencement of such production, at least one training program on the preferred operation and management of such at least one organic fishery, access to at least one supply purchase program for authorized organic feed products to be used during such production, and assistance in establishing certification monitoring by entity providing organic certification of such organic products; wherein such at least one franchisee agrees to provide to such at least one franchisor compensation for granting such at least one franchise to such at least one franchisee, operate such at least one organic fishery in accordance with such preferred operation and management, use exclusively such authorized organic feed products acquired through such at least one supply purchase program, and provide ongoing financial quality testing reporting to franchisor. Moreover, it provides such a method, wherein such assistance in the development of such at least one organic fishery within such at least one production site further comprises the steps of: assistance in the establishment of at least one pollutant-free water supply; assistance in the installation of necessary items of production equipment; assistance in the establishment of secondary on-site production using primary production waste stream; assistance in the establishment of the on-site processing of the organic products for off-site distribution; and assistance in the establishment of at least one product buyer relationship. Additionally, it provides such a method, further comprising the step of providing by the at least one franchisor to the at least one franchisee ongoing equipment maintenance.

In accordance with another preferred embodiment hereof, this invention provides a method, relating to the production of aquatic feed usable in the organic farming of seafood products, comprising the steps of: formulating at least one aquatic feed composition comprising plant-based proteins derived from at least one organically-produced plant; identifying at least one organic producer producing such organically-produced plants; arranging for the acquisition of such organically-produced plants from such at least one organic producer; producing such aquatic feed comprising such at least one aquatic feed composition using such plant-based proteins derived from such at least one organically-produced plant.

In accordance with another preferred embodiment hereof, this invention provides a system for organic farming of aquatic livestock. The system has at least one substantially enclosed container structured and arranged to contain at least one input-controlled organic environment usable to organically farm such aquatic livestock. At least one pollutant-free water-supplier is structured and arranged to supply, to the at least one substantially enclosed container, water substantially free of environmental pollutants. At least one aquatic life-support unit is structured and arranged to maintain within the at least one substantially enclosed container habitable environment consistent with sustaining growth of such aquatic livestock. At least one heating system is coupled to the at least one substantially enclosed container for heating an air mixture. The air mixture is injected into the water substantially free of environmental pollutants to heat the water substantially free of environmental pollutants.

In accordance with another preferred embodiment hereof, this invention provides each and every novel feature, element, combination, step and/or method disclosed or suggested by this patent application.

DESCRIPTION OF THE APPLICATION

Figure 1:
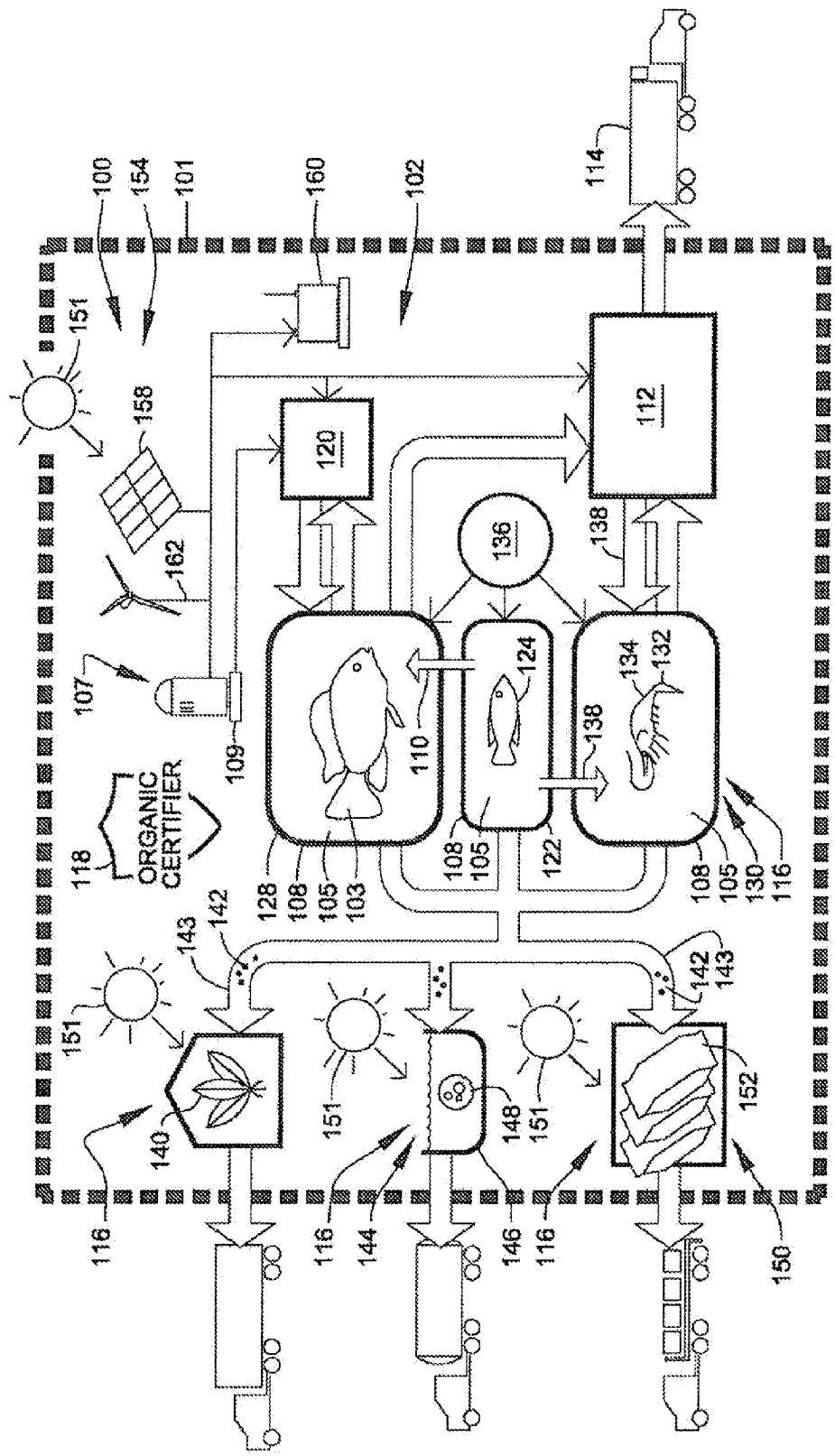
FIG. 1 shows a schematic diagram, illustrating a preferred organic aquaculture production site, according to a preferred embodiment of the present invention.

FIG. 1 shows a schematic diagram illustrating preferred organizational arrangements of an organic aquaculture production site 101, according to a preferred embodiment of the present invention. Preferred embodiments of organic fishery system 100, preferably include the depicted structures and arrangements of organic aquaculture production site 101 and provide preferred apparatus and methods enabling the production of "organic" aquatic livestock 103. In the present disclosure, the term "aquatic livestock" shall include in its definition both freshwater and saltwater aquatic animal species. Such "aquatic livestock" species shall preferably include finfish, preferably *tilapia*, and, under appropriate circumstances, catfish, carp, trout, etc. Upon reading the teachings of this specification, those of ordinary skill in the art will now understand that, under appropriate circumstances, considering such issues as commercial demand, farming costs, regulatory considerations, etc., the production of other plant and animal species, such as crayfish, lobster, clams, oysters, shrimp, cephalopods (squid and octopus), algae, non-photosynthetic members of the plant kingdom (mushrooms fungus), etc., may suffice. In the present disclosure, the term "organic" shall be understood to include, within the definition, the controlled production of aquatic livestock conducted without exposure of the livestock to drugs, hormones, supplemental synthetic chemicals (including amino acids), heavy metals, organic pollutants, bio-accumulative toxins (PBTs), nutrients containing by-products from mammalian or poultry production, or feed nutrients containing non-organically-produced components.

Such preferred embodiments of organic fishery system 100 preferably establish one or more carefully managed aquatic environments 105, wherein substantially all inputs and outputs to such environment are strictly monitored and controlled. It is within such controlled aquatic environments 105 that the primary organic aquatic livestock 103 are produced. The preferred embodiments of organic fishery system 100 are preferably adapted to use minimal off-site inputs and preferably comprise management practices that operate in harmony with the surrounding ecosystem. Upon reviewing the full scope of the teachings contained herein, those with ordinary skill in the art will appreciate that the precisely managed aquatic environments and production methods of organic fishery system 100 are capable of producing aquatic livestock marketable as "100-percent organic" under substantially all current and pending certification rules, regulations, laws, and governing sciences.

Organic aquaculture production site 101 preferably comprises at least one organic production unit 102, as shown. Each organic production unit 102 preferably comprises an interoperating arrangement of apparatus adapted to support both organic aquatic livestock production and beneficial management of the material byproducts of such production.

Aquatic farming unit 102 preferably comprises at least one isolating enclosure 108 structured and arranged to provide a substantially enclosed space physically isolated from the surrounding environment. Each isolating enclosure 108 is preferably used as a vessel in which the controlled aquatic environments 105 of the system are preferably established. Each isolating enclosure 108 preferably functions as an environmental isolator to substantially isolate the organic aquatic livestock 103 from the surrounding terrestrial environment. The highly preferred use of such isolating enclosures 108 essentially eliminates exposure of organic aquatic livestock 103 to disease vectors and environmental toxins (as aquatic livestock reared within the system have minimal direct exposure to the outside environment, which is in contrast to conventionally raised product grown in open ponds, lakes, or ocean pens).

In preferred embodiments of the system, each organic aquaculture production site 101 comprises a plurality of substantially independent controlled aquatic environments 105, each one comprising at least one isolating enclosure 108. It is noted that a single controlled aquatic environment 105 may be divided between multiple interconnected isolating enclosures 108, to accommodate the requirement of the aquatic livestock, operator preference, etc.

A controlled aquatic environment 105 of aquatic farming unit 102 is preferably maintained by at least one aquatic life-support unit 120 preferably functioning to sustain, within isolating enclosure 108, a habitable environment consistent with the sustained growth of organic aquatic livestock 103. Each aquatic life-support unit 120 preferably comprises at least one source of one pollutant-free water 107, means to aerate water 107, and means for removing toxic waste compounds from water 107 during the production cycle.

The pollutant-free water for controlled aquatic environments 105 is preferably sourced from at least one ground well, most preferably an on-site well 109, preferably extracting water 107 from a deep geologic source. Such deep-strata sourcing preference assures that water 107 is free from surface contaminants (bacteria, fungus, fertilizers, pesticides, heavy metals, etc.). Water 107 is preferably tested to assure that the water chemistry (preferably including mineral content and pH) falls within a level consistent with the organic production. To prevent leaching of soluble metals into water 107 during pumping, on-site well 109 preferably comprises a non-metallic well casing, preferably a polyvinyl chloride (PVC) casing. If another source of water must be use, the water is preferably tested for chemicals, and any chemicals present are preferably removed prior to use to provide water suitable for the production of the organic product. The above described preferred arrangements of organic fishery system 100 preferably at least embody herein at least one pollutant-free water-supplier structured and arranged to supply, to such at least one substantially enclosed container, water substantially free of environmental pollutants.

A controlled aquatic environment 105 is preferably established by introducing a volume of pollutant-free water 107 within at least one isolating enclosure 108 followed by the commencing of the operation of aquatic life-support unit 120. After a preferred conditioning period, at least one production population 110 comprising organic aquatic livestock 103 is preferably introduced into respective isolating enclosures 108 containing controlled aquatic environments 105.

In a preferred operation, at least one of the controlled aquatic environments 105 of aquatic farming unit 102 is preferably adapted to function as an isolated nursery 122 for generating a fry population 124 of organic aquatic livestock 103. It is preferably from such fry population 124 that a substantially monosex production population 110 is developed.

Preferred aquatic livestock species, preferably the cichlid genus *Tilapia*, are preferably reproduced in such isolated nurseries. Male and female breeding pairs are preferably separated from the production population and housed separately in a smaller hatchery tank for breeding. Once the eggs are fertilized, the male is removed allowing the female to incubate the eggs until the eggs hatch and are released into isolated nursery 122. In the production of *tilapia*, the time involved is usually about 21 days. The female is then preferably removed and the fry population 124 begins their growth to fingerlings, typically in about another 30 days. Each fingerling typically consumes daily an amount of organic feed 136 equaling approximately two percent of body weight.

At the completion of the about-30-day growth period, the fingerlings are preferably sorted by sex to produce the substantially monosex production population 110. In the preferred operational method of organic fishery system 100, the preferred monosex production population 110 produced from the fry population 124 is all male, due to their higher average growth rates and comparatively higher, harvest weights. A preferred method of producing monosex production population 110 is to physically sort males from the mix-sex fry population by visual identification. When tilapias reach about 10 cm in length, the sexes may be distinguished by inspecting the genital papillae on the underside of the fish. To facilitate such a method, fingerlings are preferably swabbed with an organic dye to assist visual differentiation of the external sex structures.

The substantially monosex production population 110 is preferably transferred to one or more larger grow-out enclosures 128, each preferably comprising an isolating enclosure 108 containing at least one controlled aquatic environment 105 (at least embodying herein the step of introducing such at least one substantially monosex production population within such at least one grow-out enclosure and managing such at least one grow-out enclosure to maintain a habitable environment consistent with the growth of such at least one substantially monosex production population and organic production practices).

Female fingerlings are preferably used for brood stock or are converted into organic feed 138 used to support at least one secondary aquatic-product production 130, as shown. Secondary aquatic-product production 130 (at least embodying herein, at least one on-site secondary aquatic-product producer) is preferably adapted to produce, substantially onsite, at least one secondary organic aquatic product 132. Preferred secondary organic aquatic product 132 includes organic shell fish, preferably shrimp 134, as shown.

Figure 2:
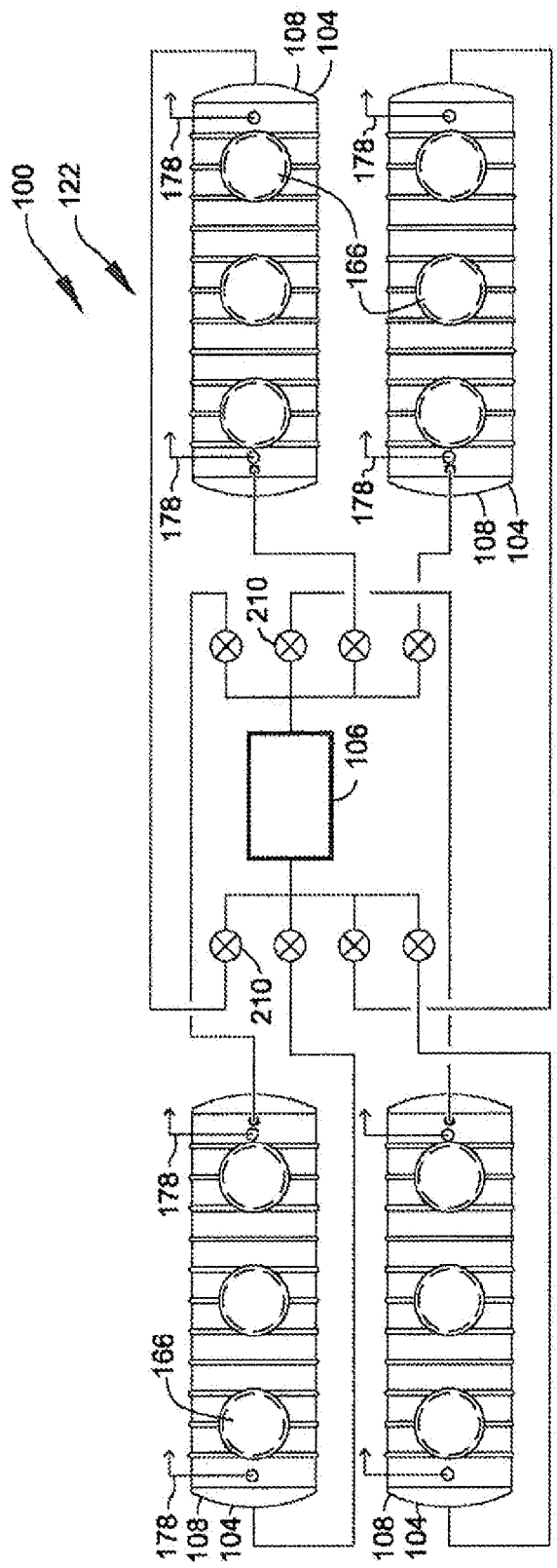
FIG. 2 shows a schematic plan view, illustrating a preferred arrangement of an isolated nursery supporting the raising of juvenile organic aquatic livestock, according to a preferred embodiment of the present invention.
Figure 3:
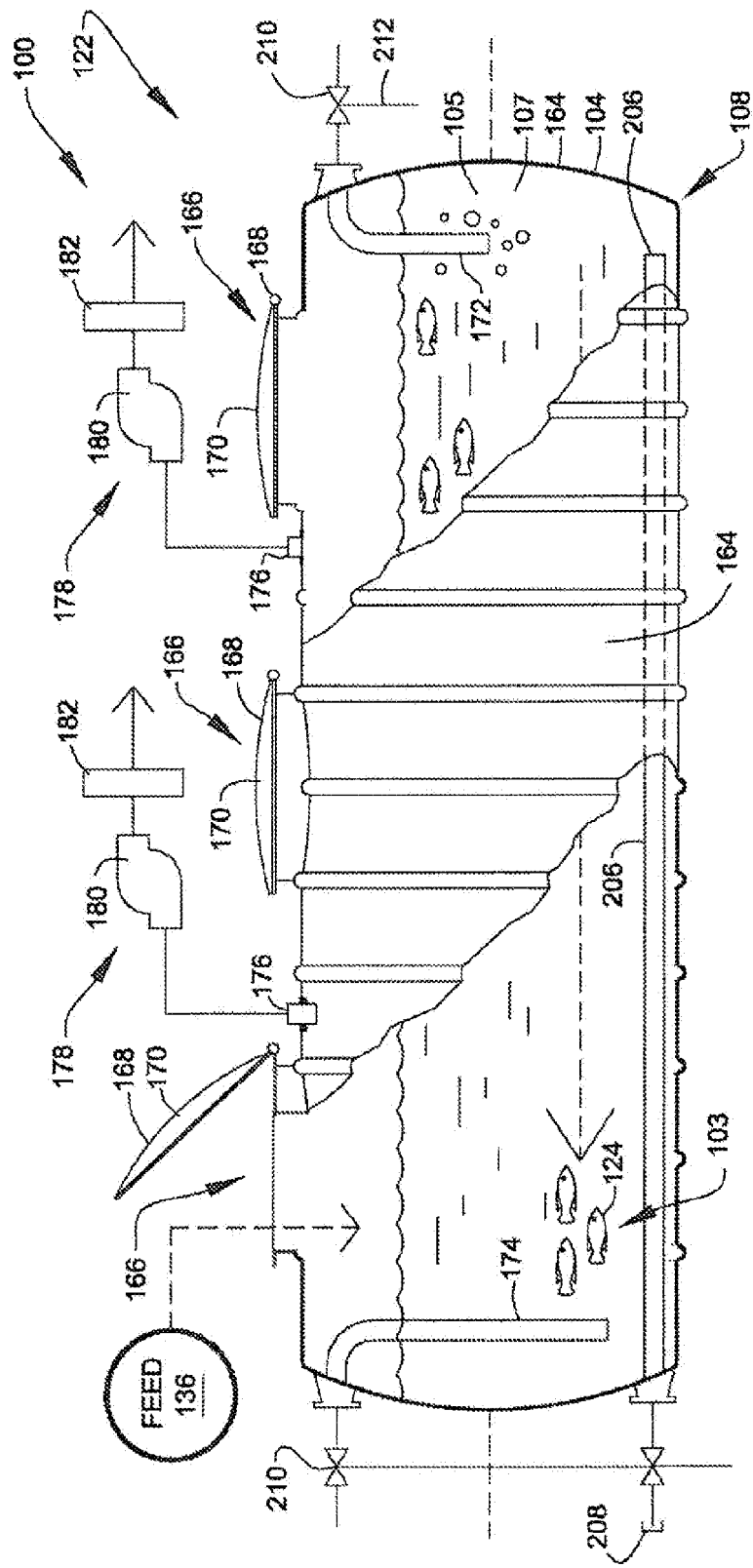
FIG. 3 shows a side view, in partial section, of an isolating enclosure of the isolated nursery of FIG. 2.
Figure 4:
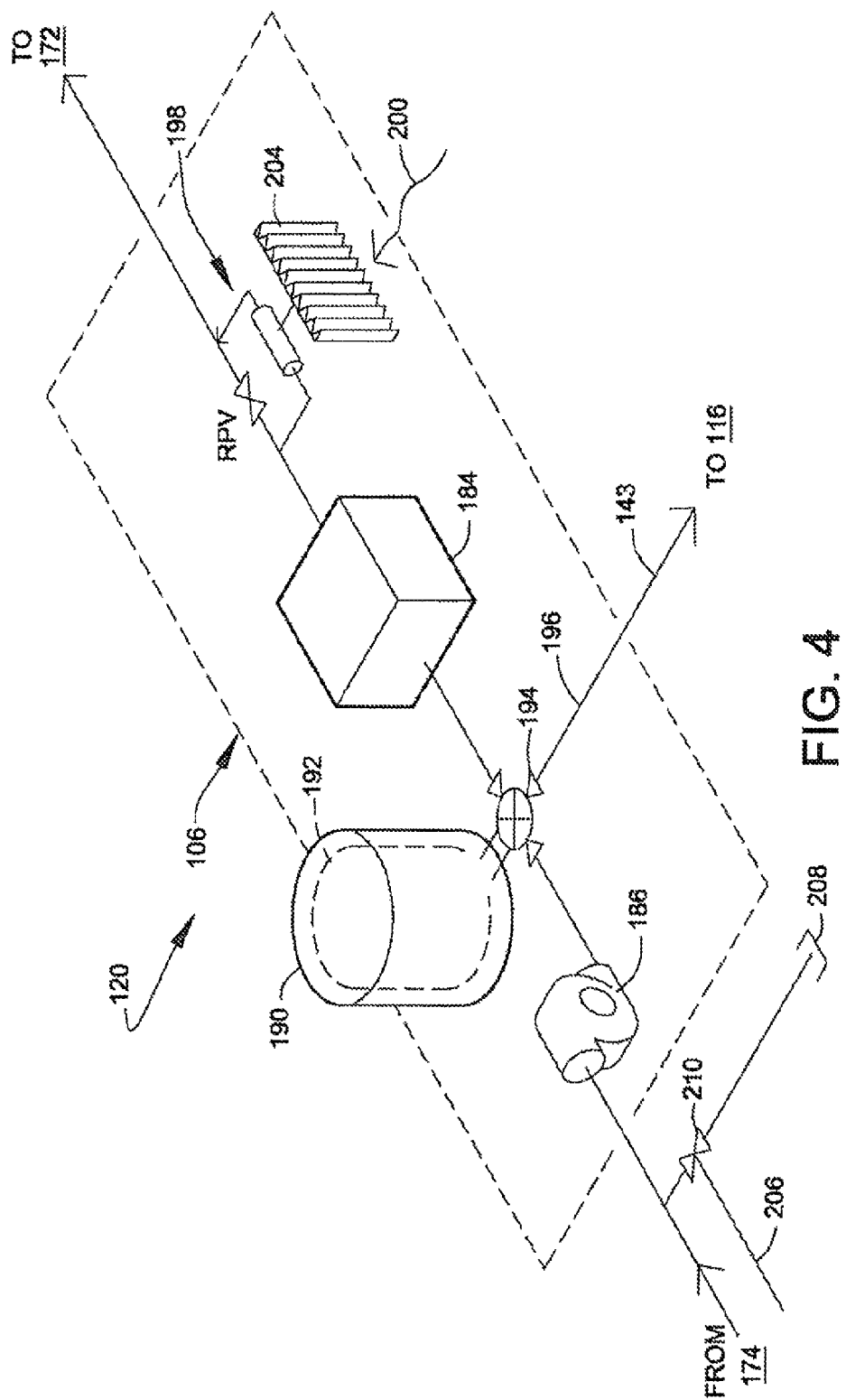
FIG. 4 shows a schematic diagram, illustrating a preferred mechanical support subsystem, according to the preferred embodiment of FIG. 2.

It is noted that both isolated nursery 122 and secondary aquatic-product production 130 each preferably utilize at least one isolating enclosure 108 preferably containing a controlled aquatic environment 105. As previously noted, each controlled aquatic environment 105 is preferably maintained by at least one aquatic life-support unit 120. Specific preferred arrangements of isolated nursery 122 are illustrated in FIG. 2 through FIG. 4.

The substantially monosex production population 110 customarily reach 1 to 1½ pounds in about 60 to 90 days, from the time they are introduced into grow-out enclosures 128. Thus, the total growth period (from egg to harvest) is typically 120 to 140 days. The preferred use of a substantially monosex production population 110 eliminates the need for behavior-suppressing hormones during production, an important factor in maintaining the ability to achieve organic certification.

For the above-described production timeframe to be accurate, the food and water must be properly managed during the production cycle. Water 107 is preferably filtered, tested, and replenished as necessary. The input of feed rations to support the growth of organic aquatic livestock 103 is strictly controlled as part of the preferred management of aquatic farming unit 102. Organic aquatic livestock 103 are provided with organic feed 136 preferably formulated using only 100-percent organic components. More specifically, organic feed 136 is preferably free of preferably each and preferably all of: drugs, hormones, supplemental synthetic chemicals, heavy metals, organic pollutants, PBTs, nutrients containing by-products from mammalian or poultry production, and feed nutrients containing non-organically-produced components. Preferred formulations meet the minimum nutritional requirements of organic aquatic livestock 103 and closely match the nutrient compositions found in the natural diet of the particular aquatic species. Preferred formulations of organic feed 136 contain only materials from certified organic sources, preferably including lipids from certified organic fish oil or other omega-3 fatty acids sources, produced by organic microorganisms or organic plants, to meet the nutritional requirement of the particular aquatic species.

During production, organic aquatic livestock 103 are preferably supplied about 1½ pounds of organic feed 136 per pound of organic aquatic livestock 103.

The production population 110 is preferably harvested at the conclusion of a grow-out period associated with the particular aquatic species. For the preferred *tilapia* fin fish, as noted, the total grow-out period is typically about 120 to 140 days. During the grow-out period, progeny resulting from unintended occurrences of females within the substantially monosex production population 110 are preferably removed from grow-out enclosures 128. A preferred means for removal of juveniles comprises the introduction of at least one predatory species within grow-out enclosure 128. Upon reading this specification, those with ordinary skill in the art will now appreciate that, under appropriate circumstances, considering such issues as cost, user preference, regulatory requirements, etc., other removal arrangements such as, for example, manual netting of juveniles, etc., may suffice.

On harvesting, the matured organic aquatic livestock 103 are preferably transferred to at least one on-site processing plant 112 for processing, as shown. On-site processing plant 112 preferably prepares the harvested product for shipping to off-site markets, preferably using one or more distribution channels 114, as shown. On-site processing plant 112 preferably performs cleaning, freezing, and packaging of the product prior to transport. Upon reading this specification, those with ordinary skill in the art will now appreciate that, under appropriate circumstances, considering such issues as cost, market structures, etc., other distribution arrangements such as, for example, incorporating the production site within an end-use market site (e.g., a local seafood market), providing fresh (unfrozen) product, etc., may suffice.

Byproducts of on-site processing plant 112 (carcasses, viscera, and trimmings) are preferably converted to organic feed 138, which are preferably used to support secondary aquatic-product production 130, as shown. A preferred benefit of such preferred methodology is the farming of secondary organic aquatic product 132 (for example, shrimp 134) having higher than expected levels of omega-3 fatty acids. This preferred benefit is a direct result of the preferred use of byproducts of the primary production. Thus, secondary organic aquatic product 132 may be marketed as 100 percent organic and may be marketed as comprising added health benefits associated with enhanced omega-3 content.

The highly-controlled aquatic environments 105 are preferably managed in a manner consistent with the growth of such production population 110 and strict organic production practices. As part of the preferred production methodology of organic fishery system 100, at least one organic certification entity 118 is provided preferably-uninterrupted access to organic aquaculture production site 101 during such organic production. Depending on the prevailing certification requirements at the time of production, organic certification entity 118 may comprise, for example, a governmental organic inspector (e.g., a United States Department of Agriculture field representative), authorized certification contractor, or similar overseeing entity or agent. Regardless of the operating regulatory structures, the system preferably grants organic certification entity 118 full access to observe and test any and all relevant aspects of the production. This preferred feature of the system facilitates the granting of rights to market the processed organic aquatic livestock 103 as certified organic in commerce (as defined and regulated by organic certification entity 118). Upon reading this specification, those with ordinary skill in the art will now appreciate that, under appropriate circumstances, considering such issues as jurisdiction, markets serviced, etc., other certification arrangements such as, for example, site operator sampling/ reporting, random sampling, providing on-site facilities for an organic certification entity, etc., may suffice.

Organic fishery system 100 preferably reduces the environmental impact of production through on-site management of production waste by-products. Aquatic farming unit 102 preferably provides one or more preferred on-site byproduct utilizers 116, as shown. Each on-site byproduct utilizer 116 is preferably designed to utilize at least one byproduct generated by the primary organic aquatic livestock 103 during the organic production.

Within the preferred operation of aquatic farming unit 102, the above described secondary aquatic-product production 130 is a preferred example of an on-site byproduct utilizer 116. In another preferred embodiment of aquatic farming unit 102, on-site byproduct utilizer 116 preferably comprises at least one surface crop 140 structured and arranged to utilized at least one nitrogen-containing solid waste 142 produced by organic aquatic livestock 103 as a fertilizer. In preferred operation, waste water 143 containing solid waste 142 is generated by the backwashing of filters within aquatic life-support units 120. Aquatic farming unit 102 is preferably adapted to deliver waste water 143 (containing the natural fish emulsion) to surface crops 140, as shown. Surface crops 140 may preferably comprise hydroponically-grown plants, conventional surface crops, or a combination of both. Preferred surface crops 140, preferably romaine lettuce, are preferably used as supplemental organic feed for organic aquatic livestock 103.

In another preferred embodiment of aquatic farming unit 102, on-site byproduct utilizer 116 preferably comprises at least one photosynthetic-organism cultivator 144 structured and arranged to cultivate at least one photosynthetic-organism capable of yielding at least one lipid compound usable in the production of at least one biofuel. Photosynthetic-organism cultivator 144 preferably comprises one or more biomass support structures 146 containing at least one algae-based fuel producer 148, as shown. In preferred operation, waste water 143 containing solid waste 142 is preferably transferred to photosynthetic-organism cultivator 144, as shown. Within photosynthetic-organism cultivator 144, the solid waste is first converted to carbon dioxide (CO), preferably using the metabolic respiration of one or more bacteria colonies. Algae based fuel producers 148 within photosynthetic-organism cultivator 144 preferably use the $CO_2$, water 107, and sunlight 151 to convert the $CO_2$ into sugar, which the algae cultures metabolize into lipids usable as bio-fuel. The resulting lipid-rich algae biomass is preferably harvested for processing. Such processing may preferably occur on-site prior to offsite shipping. Alternately preferably, the algae biomass is shipped off-site for conversion to bio-fuel. Upon reading this specification, those with ordinary skill in the art will now appreciate that, under appropriate circumstances, considering such issues as market costs, advances in technology, local regulation, etc., other biomass utilization arrangements such as, for example, the use of algae-based biomass for fertilizers, livestock feed additives, carbon sequestration, industrial products, etc., may suffice. Preferred bio-support structures 146 are preferably selected after analysis of site-specific criteria, such as average site temperature, available area, production output, etc. Preferred bio-support structures 146 comprise technologies ranging from open holding ponds to enclosed photo-bioreactors.

In another preferred embodiment of aquatic farming unit 102, on-site byproduct utilizer 116 preferably comprises at least one organic fertilizer processor 150 structured and arranged to produce organic fertilizer 152 from nitrogen-containing solid waste 142 produced by organic aquatic livestock 103. Organic fertilizer processor 150 preferably comprises at least one waste dryer structured and arranged to produce organic fertilizer 152 by removing residual water from the solid waste 142 of waste water 143, preferably through at least one solar-driven evaporative process, as shown. In a preferred arrangement, organic fertilizer processor 150 comprises an array of drying surfaces over which waste water 143 is pumped. As the mixture flows over corrugations of the surfaces, solid waste 142 falls out of the suspension, preferably depositing on the underlying drying surfaces. The clarified water is preferably collected for subsequent treatment and on-site reuse.

Once a sufficient amount of solid waste 142 has been deposited, the layer of the solid waste 142 is preferably left to dry with the assistance of sunlight 151 (at least embodying herein wherein such at least one dryer is structured and arranged to dry the at least one organic fertilizer using substantially solar energy). Alternately preferably, the solid waste 142 is processed in drying ponds having liners to prevent leaching of nitrates into the soil.

Once dry, the solid waste 142 is collected, packaged, and shipped to off-site markets, as shown. Upon reading this specification, those with ordinary skill in the art will now appreciate that, under appropriate circumstances, considering such issues as cost, operator preference, site organization, etc., other processing arrangements such as, for example, utilizing the fertilizer in on-site agriculture production, shipping the fertilizer in bulk for off-site packaging/distribution, etc., may suffice.

The above-described on-site byproduct utilizers preferably capture and recycle substantially all nitrogen and phosphorus generated within organic aquaculture production site 101. Thus, the operation of organic aquaculture production site 101 has a minimal impact to the surrounding ecosystem Aquatic farming unit 102 preferably comprises at least one on-site electrical power source 154 to provide on-site electrical power should a primary source of electrical power fail. This preferred arrangement reduces the likelihood that a production population 110 would be lost in the event of a prolonged power outage. On-site electrical power source 154 preferably comprises at least one backup generator 160, preferably operating using at least one locally-stored fuel source, preferably at least one renewable fuel source produced substantially onsite.

A preferred embodiment of on-site electrical power source 1.54 preferably comprises at least one solar array 158 electrically coupled to at least one battery storage device electrically coupled to backup generator 160. Such an embodiment is preferably structured and arranged to produce and store operable power substantially by the conversion of solar energy. Another preferred embodiment of on-site electrical power source 154 preferably comprises at least one wind-turbine array 162 electrically coupled to at least one battery storage device 160, as shown. Such an embodiment is preferably structured and arranged to produce and store operable power substantially by the conversion of wind energy. Upon reading this specification, those with ordinary skill in the art will now appreciate that, under appropriate circumstances, considering such issues as cost, site location, advances in technology, etc., other renewable energy arrangements such as, for example, tidal energy, hydropower, biomass, geothermal, bio-fuels, hydrogen, etc., may suffice.

FIG. 2 shows a schematic plan view, illustrating a preferred arrangement of isolated nursery 122 supporting the raising of juvenile organic aquatic livestock 103, according to a preferred embodiment of organic fishery system 100. FIG. 3 shows a side view, in partial section, of isolating enclosure 108 of the isolated nursery 122 of FIG. 2. FIG. 4 shows a schematic diagram, illustrating a preferred mechanical support subsystem (hereinafter referred to as skid 106), according to the preferred embodiment of FIG. 2.

Isolated nursery 122 of aquatic farming unit 102 preferably utilizes one or more isolating enclosures 108, preferably four interlinked production tanks 104, each one preferably comprising a capacity of between about 4,000 and 12,000 gallons. Each production tank 104 preferably comprises a substantially impermeable outer containment wall 164 to contain the controlled aquatic environments 105 within production tanks 104. Outer containment wall 164 preferably functions as an environmental barrier to protectively separate the controlled aquatic environment from the surrounding ecosystem. Upon reading this specification, those with ordinary skill in the art will now appreciate that, under appropriate circumstances, considering such issues as design preference, user preferences, marketing preferences, cost, structural requirements, available materials, technological advances, etc., other environmental barrier arrangements such as, for example, use of the ground between tanks, use of soils, etc., may suffice.

Each production tank 104 preferably comprises at least one closeable access port 166 providing external access through outer containment wall 164 to the controlled aquatic environment(s) 105 contain therein. More specifically, each production tank 104 preferably comprises three 48-inch diameter closable access ports 166, as shown. In a preferred embodiment of production tank 104, access ports 166 are preferably constructed using 48-inch diameter PVC pipe engaged on outer containment wall 164 using ring collars on the upper surface of the tank.

Each closeable access port 166 is preferably equipped with at least one operable cover 168, as shown. Operable covers 168 preferably function to seal the access to assist in maintaining the preferred physical isolation between controlled aquatic environment 105 and the surrounding environment.

Each operable cover 168 preferably comprises overlapping hinged panel structure with dust seal and padlock hasp. To provide daylight within the interior of production tank 104, operable covers 168 are preferably fitted with light-conducting panel 170, as shown.

For water circulation, each production tank 104 preferably comprises inlet 172 and outlet 174, preferably located at opposing ends of production tank 104, as shown. Inlet 172 preferably comprises a 4-inch diameter pipe discharging at an elevation about half way between the top and bottom of the tank interior, as shown. Outlet 174 preferably comprises a 4-inch diameter pipe having a suction inlet positioned at an elevation above the bottom of the tank equaling about one-quarter of the tank diameter. Together, inlet 172 and outlet 174 achieve a continuous and complete cross-flow circulation of water 107 along the length of production tank 104, as indicated by the dashed arrow depiction.

During production, the juvenile organic aquatic livestock 103 excrete ammonia as a by-product of protein metabolism. Additional quantities of ammonia are sometimes released into water 107 as the result of the decomposition of uneaten food. In the substantially enclosed controlled aquatic environments 105, ammonia gas discharged from the surface of water 107 is preferably exhausted from the interior of the tank through at least one vent head 176. In a preferred arrangement, vent heads 176 are located at each end of production tank 104, as shown. Each vent head 176 preferably comprises a 4-inch diameter PVC pipe passing from the interior of the tank outwardly through outer containment wall 164, as shown. At least one vent head 176 is preferably coupled to gas exhauster unit 178, as shown. Gas exhauster unit 178 preferably comprises a mechanically-driven exhaust fan 180 adapted to draw ammonia gas from the interior of production tank 104 and discharge the gas through at least one absorptive filter 182, as shown. Alternately preferably, gas exhauster unit 178 may be passively operated by atmospheric pressure developed during active aeration of water 107 within production tank 104.

Each production tank 104 is preferably made of the same products of which water storage containers are constructed, most preferably a material suitable for containing potable water, most preferably fiberglass, alternately preferably polypropylene. Preferred production tanks 104 comprise a generally hollow cylindrical shape, as shown. To facilitate overland shipping of the tanks, preferred production tanks 104 comprise a maximum outer diameter of about eight feet. Preferred potable water tanks suitable for use as production tanks 104 include products produced by Darco Incorporated of Bennett, Colo. Upon reading this specification, those with ordinary skill in the art will now appreciate that, under appropriate circumstances, considering such issues as cost, site conditions, livestock species, etc., other tank arrangements such as, for example, membrane-lined concrete vaults, inflated structures, tanks of alternate polymer construction, stainless steel tanks, underground-place-able tanks, etc., may suffice.

Aquatic life-support unit 120 of isolated nursery 122 is preferably embodied within skid 106. Skid 106 preferably comprises equipment for circulating, filtering, heating (when necessary), and aerating the water 107 within up to four production tanks 104 simultaneously. Skid 106 is preferably assembled from standard commercial components, preferably swimming-pool-type components, preferably operated on 110-volt AC electricity (with the exception of heater 184).

Skid 106 preferably comprises a single centrifugal-type pump 186 to circulate water 107 within isolated nursery 122. Pump 186 is preferably coupled between respective inlets 172 and outlets 174 of the tanks through a set of valve-controlled manifolds 188, as shown. Each manifold 188 preferably comprises a series of isolation valves, as shown, thus allowing any individual tank to be isolated from the remainder of the system.

Pump 186 preferably comprises a preferred rating of between about 3 to 5 horsepower and is capable of producing a maximum working pressure of about 250 pound per square inch. Preferred centrifugal-type pumps suitable for use as pump 186 include model EPE30K4M produced by Franklin Electric of Bluffton, Ind. under the MONARCH brand name.

The discharge side of pump 186 is preferably coupled to filter unit 190, as shown. A preferred filter unit 190 comprises a 36-inch Multimedia back-washable filter produced by Amiad Filtration Systems Ltd. of Oxnard, Calif. Filter unit 190 preferably functions as a toxic-compound remover by removing at least one toxic compound from water 107 as it circulates to and from production tanks 104.

Filter unit 190 preferably performs the filtration of water 107 through a layer of graded particles. These particles preferably comprise sand, gravel, and at least one bio-filtering media 192. Water 107 preferably enters through the filter inlet and percolates through an internal filter bed. Suspended matter is preferably absorbed by the media particles of the bed. Ammonia (and other toxic nitrogenous compounds) are preferably removed from water 107 through at least one bio-filtration process occurring within bio-filtering media 192 of the filter bed.

Bio-filtering media 192 preferably supports the colonization of beneficial bio-filtering microorganisms. More specifically, bio-filtering media 192 of the internal bed provides a suitable substrate for the growth of nitrifying bacteria. Nitrifying bacteria within filter unit 190 are preferably used to promote the oxidation of ammonia to a nitrite and subsequently to a less harmful nitrate.

A preferred bio-filtering media 192 comprises a chemically inert material composition, preferably plastic pellets, alternately preferably porous ceramic pellets. Bio-filtering media 192 is preferably replaced on an annual basis. It is noted that effective bio-filtration of smaller-capacity tanks may be accomplished using a preferred combination of only sand and gravel within the filter bed. After passing through the bed, the filtered water 107 is preferably discharged at the filter outlet.

Cleaning of filter unit 190 is preferably done by backwashing. Water 107 supplied to filter unit 190 is preferably reversed at multiport valve 194, releasing the suspended matter from the bedding material, which matter is preferably flushed out through a backwash discharge line. Backwashing is preferably done automatically, according to pressure differential or, alternately preferably, according to time.

The water utilized for the cleaning and flushing procedure preferably comprises water that is reclaimed and re-used. Waste water 143 generated by production is produced primarily from such backwashing of filters within the aquatic life-support units 120. This waste water is anticipated to be approximately 10 percent to 15 percent of the tank's capacity per month. Waste water 143 is preferably transferred to at least one on-site byproduct utilize 116 via at least one discharge line 196. Waste water 143 not used by on-site byproduct utilizer 116 is preferably reclaimed and reused in one or more site operations Depending on the species of organic aquatic livestock 103 and local climate, water 107 is preferably passed from filter unit 190 to at least one heater 184, as shown. For the fin fish *tilapia*, water 107 is preferably maintained between about 80 and about 86 degrees continuous temperature. This preferred temperature range has been found by applicant to maintain the best controlled aquatic environments 105 for breeding and growth.

Heater 184 preferably comprises a gas-fired unit, alternately preferably a 220-volt electric unit. Alternately preferably, heater 184 comprises a solar-powered unit using heat supplied by an onsite array. It is noted that the preferred use of heaters are dependent on regional temperature averages and would not be required for temperate climates, such as, for example, Blythe Calif.

From heater 184, water 107 preferably passes through at least one aerator 198 structured and arranged to aerate water 107 prior to returning water 107 to production tanks 104. Aerator 198 preferably comprises at least one venturi-type air injector using the movement of water 107 to create a region of reduced pressure inside an injector body, which reduced pressure draws air 200 through air filter 204 and injects the filtered air into water 107. This preferred arrangement eliminates the need for an additional mechanical air pump and allows skid 106 to be more compact. Air filter 204 is preferably used to prevent the introduction of bacteria, mold spores, and similar airborne vectors into water 107 during aeration. Aerator 198 for skid 106 preferably comprises a Mazzei brand model 1078-2 unit. Air filter 204 preferably comprises a Honeywell brand model 200E1037. Upon reading this specification, those with ordinary skill in the art will now appreciate that, under appropriate circumstances, considering such issues as cost, user preference, etc., other filter arrangements such as, for example, the use of inline ultraviolet disinfectors, membrane filters, etc., may suffice.

After aeration, water 107 is preferably returned to production tank 104 via inlet 172. The above-noted equipment of skid 106 is preferably designed to turn over water 107 in each production tank 104 about six times in each 24-hour period, with enough flow through the tank to help move debris along the bottom toward suction sparger 206.

Each production tank 104 preferably comprises suction sparger 206 to assist in removing solid wastes from the interior of the production tanks. Suction sparger 206 preferably comprises a perforated pipe extending along the length of the interior of production tank 104, as shown. Suction sparger 206 preferably comprises an external coupler 208 allowing suction sparger 206 to be coupled to a pumping vehicle (or other means for transferring waste water 143 to an on-site waste utilizer).

Each production tank 104 further comprises one or more control valves 210 preferably adapted to permit the redirection of water 107 within the system: for example, at least one control valve 210 is preferably provided to allow skid 106 to draw water 107 directly from suction sparger 206, as required. In addition, each production tank 104 preferably comprises a preferred series of control valves 210, in combination with at least one water input port 212, preferably arranged to allow an input of water 107 directly from on-site well 109. This preferred arrangement provides for initial filling of the tanks as well as a means for providing emergency water circulation should skid 106 require service during a production cycle. Isolated nursery 122 preferably comprises a series of isolation valves 210, as shown, on the inlets and the outlets of the tanks, thus allowing any individual production tank 104 to be isolated from the remainder of the system.

Differing types of feed 136 are preferably used in the different stages of growth; however, all feeds 136 introduced into controlled aquatic environments 105 are preferably formulated from 100-percent organic materials. The fry are preferably fed a fine meal. As the fry grow to fingerlings, a slightly coarser feed 136 is preferably utilized. This product is preferably a floating-type feed that is preferably manually broadcast through one or more access ports 166

At the completion of the 30-day growth period, the fingerlings are preferably sorted by sex to produce the male monosex production population 110. The monosex production population is preferably transferred to the larger grow-out enclosures 128 described in FIG. 5 through FIG. 7.

Figure 5:
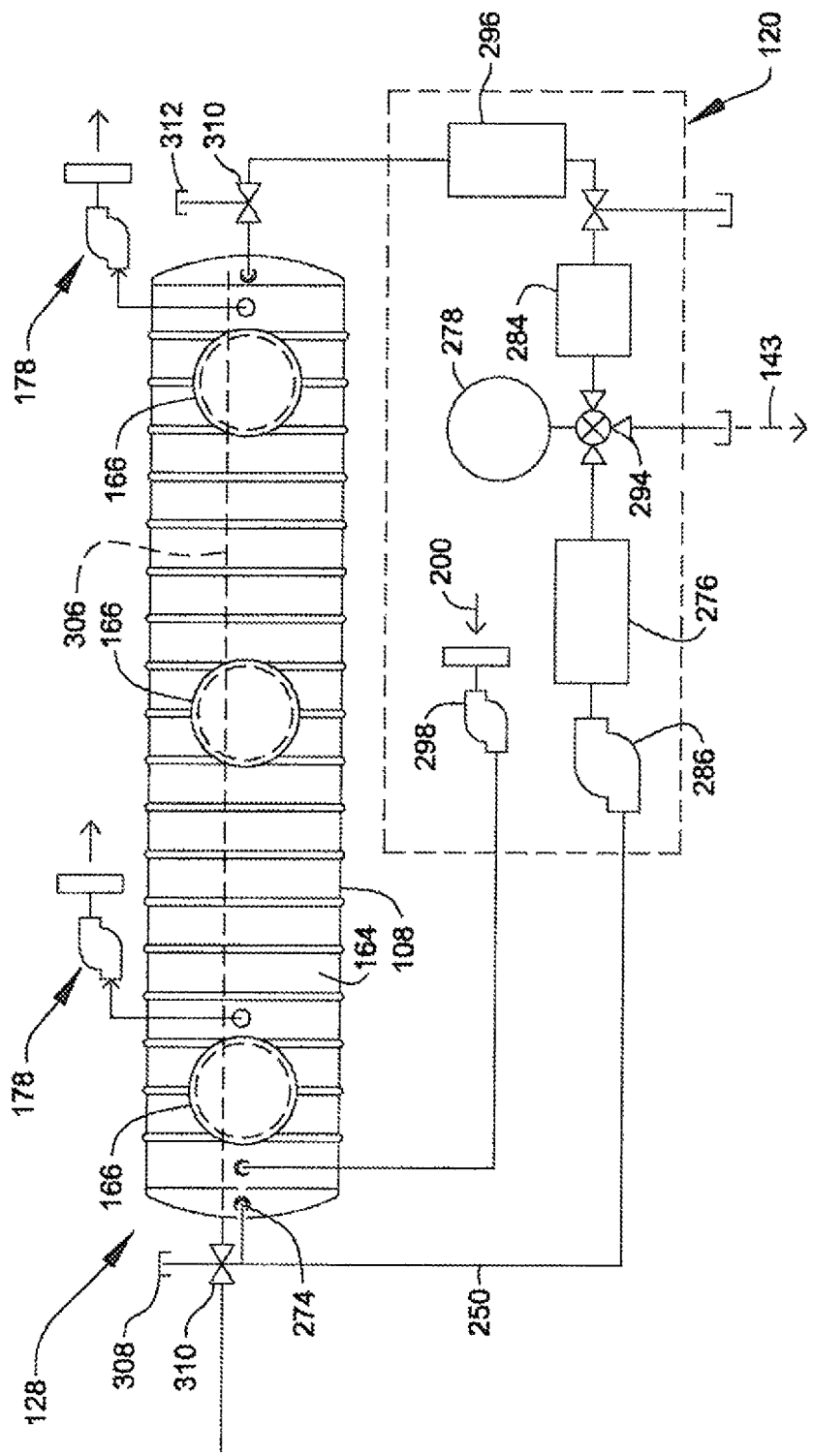
FIG. 5 shows a schematic plan view, illustrating a preferred arrangement of a single grow-out enclosure supporting the raising of organic aquatic livestock, according to a preferred embodiment of the present invention.
Figure 6:
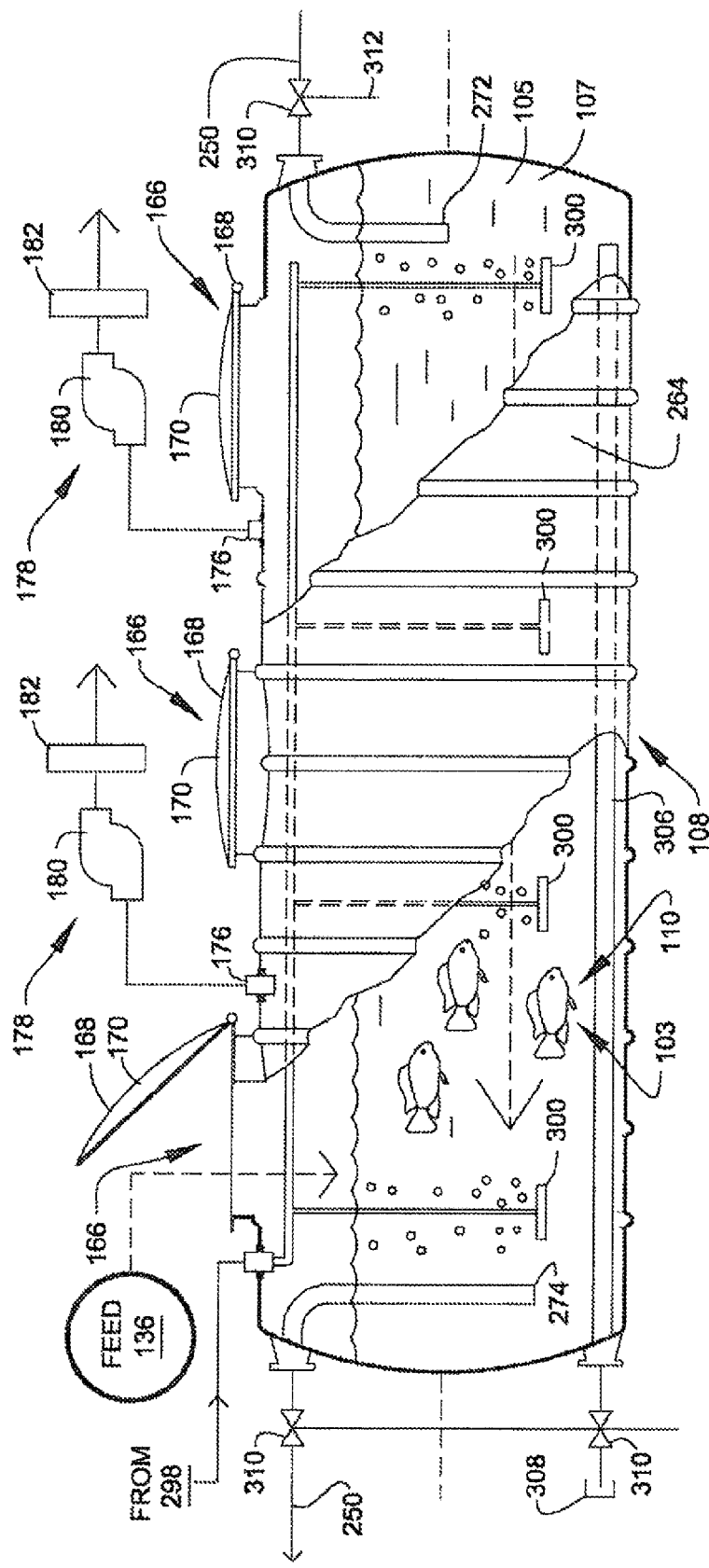
FIG. 6 shows a side view, in partial section, of the grow-out enclosure of FIG. 5.
Figure 7:
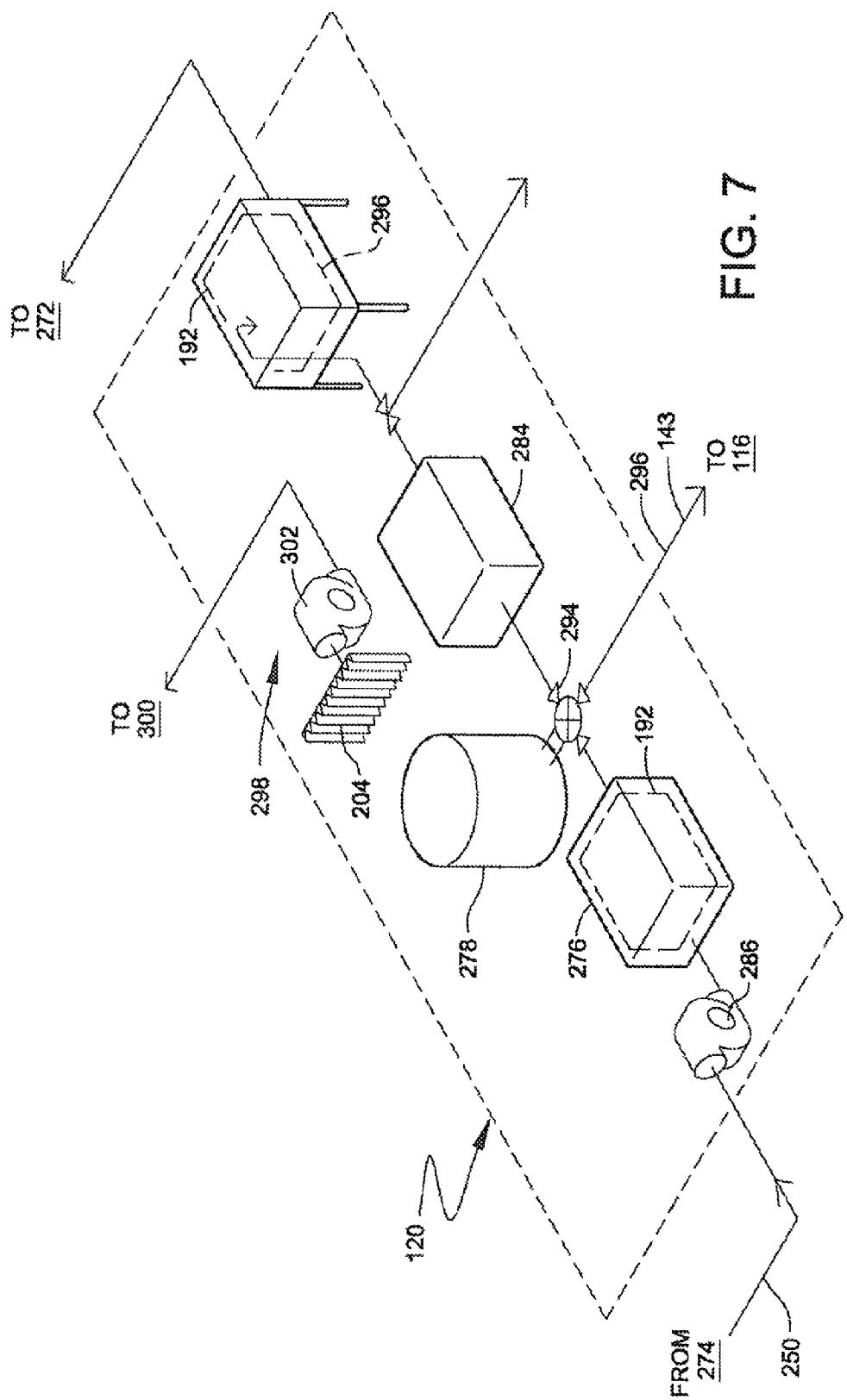
FIG. 7 shows a schematic diagram, illustrating a preferred aquatic life-support unit, according to the preferred embodiment of FIG. 5.

FIG. 5 shows a schematic plan view, illustrating a preferred arrangement of a single grow-out enclosure 128 supporting the raising of organic aquatic livestock 103, according to a preferred embodiment of organic fishery system 100. FIG. 6 shows a side view, in partial section, of grow-out enclosure 128 of FIG. 5. FIG. 7 shows a schematic diagram, illustrating a preferred aquatic life-support unit 120, according to the preferred embodiment of FIG. 5.

Within aquatic farming unit 102, the fingerlings of the monosex production population 110 are preferably divided between one or more isolating enclosures 108, each one preferably containing a substantially independent controlled aquatic environment 105. Each isolating enclosure 108 preferably comprises a single grow-out enclosure 128 comprising a capacity of about 12,000 gallons. Preferred organic aquaculture production sites 101 may be populated with between one and several hundred grow-out enclosures 128.

Each grow-out enclosure 128 preferably comprises a substantially impermeable outer containment wall 264 to contain the controlled aquatic environments 105 within grow-out enclosure 128. Outer containment wall 264 preferably functions as an environmental barrier to protectively separate the controlled aquatic environment 105 from the surrounding ecosystem.

Each grow-out enclosure 128 preferably comprises at least one closeable access port 166 providing external access through outer containment wall 264 to the controlled aquatic environment(s) 105 contain therein. More specifically, each grow-out enclosure 128 preferably comprises three 48-inch diameter closable access ports 166, as shown. In a preferred embodiment of grow-out enclosure 128, access ports 166 are preferably constructed using 48-inch diameter PVC pipe engaged on outer containment wall 264 using ring collars on the upper surface of the tank.

Each closeable access port 166 is preferably sealed with an operable cover 168 to assist in maintaining the preferred physical isolation between controlled aquatic environment 105 and the surrounding environment. Each operable cover 168 preferably comprises overlapping hinged panel with dust seal and padlock hasp. To provide daylight within the interior of grow-out enclosure 128, operable covers 168 are preferably fitted with light-conducting panel 170, as shown.

Each grow-out enclosure 128 preferably comprises water inlet 272 and water outlet 274, preferably located at opposing ends of the tank interior, as shown. Inlet 272 preferably comprises a 4-inch diameter pipe discharging at an elevation about half way between the top and bottom of the tank interior, as shown. Outlet 274 preferably comprises a 4-inch diameter pipe having a suction inlet positioned at an elevation above the bottom of the tank equaling about one-quarter of the tank diameter. Together, inlet 272 and outlet 274 achieve a continuous and complete cross-flow circulation of water 107 along the length of grow-out enclosure 128, as shown.

In a manner similar to production tanks 104, ammonia gas discharged from the surface of water 107 is preferably exhausted from the interior of the tank through at least one vent head 176. In a preferred arrangement, vent heads 176 are located at each end of grow-out enclosure 128, as shown. Each vent head 176 preferably comprises a 4-inch diameter PVC pipe passing from the interior of the tank outwardly through outer containment wall 264, as shown. At least one vent head 176 is preferably coupled to gas exhauster unit 178, as shown. Gas exhauster unit 178 preferably comprises a mechanically-driven exhaust fan 180 adapted to draw ammonia gas from the interior of grow-out enclosure 128 and discharge the gas through at least one absorptive filter 182, as shown. Alternately preferably, gas exhauster unit 178 may be passively operated by atmospheric pressure developed during active aeration of water 107 within grow-out enclosure 128.

Each grow-out enclosure 128 is preferably made of the same products as that of production tank 104, most preferably a material suitable for containing potable water, most preferably fiberglass, alternately preferably polypropylene. Preferred grow-out enclosures 1.28 comprise a generally hollow cylindrical shape, as shown. To facilitate overland shipping of the tanks, preferred grow-out enclosures 128 comprise a maximum outer diameter of about eight feet. Preferred potable water tanks suitable for use as grow-out enclosures 128 include products produced by Darco Incorporated of Bennett, Colo. Upon reading this specification, those with ordinary skill in the art will now appreciate that, under appropriate circumstances, considering such issues as cost, site conditions, livestock species, etc., other tank arrangements such as, for example, membrane-lined concrete vaults, inflated structures, tanks of alternate polymer construction, stainless steel tanks, etc., may suffice. Upon reading this specification, those with ordinary skill in the art will now appreciate that, under appropriate circumstances, considering such issues as design preference, user preferences, marketing preferences, cost, structural requirements, available materials, technological advances, etc., other tank arrangements such as, for example, underground tanks, partially underground tanks, partially dirt covered tanks etc., may suffice.

As the organic aquatic livestock 103 approach harvest weight, they excrete larger quantities toxic ammonia as a by-product of metabolism. In addition, the oxygen demand within the substantially enclosed grow-out enclosure 128 increases with the growth of the organic aquatic livestock 103. These greater demands necessitate the use of a dedicated aquatic life-support unit 120 at each grow-out enclosure 128, as shown.

Each grow-out enclosure 128 preferably comprises at least one water-circulation subsystem 250 structured and arranged to circulate the volume of water 107 between the substantially enclosed grow-out enclosure 128 and aquatic life-support unit 120, as shown. Aquatic life-support unit 120 preferably comprises equipment for circulating, filtering, heating (when necessary), and aerating the water 107 within a single grow-out enclosure 128, as shown.

Aquatic life-support unit 120 preferably comprises a single centrifugal-type pump 286 to circulate water 107 within grow-out enclosure 128. Pump 286 is preferably coupled to outlet 274 of the tanks through water-circulation subs stem 250, as shown. Pump 286 preferably comprises a preferred rating of between about 3 to 5 horsepower and is capable of producing a maximum working pressure of about 250 pounds per square inch. Preferred centrifugal-type pumps suitable for use as pump 286 include model EPE30K4M produced by Franklin Electric of Bluffton, Ind. under the MONARCH brand name.

The discharge side of pump 286 is preferably coupled to a first bio-filter bed 276, as shown. Bio-filter bed 276 preferably functions as a toxic-compound remover by promoting the oxidation of ammonia to a nitrite and subsequently to a less harmful nitrate, preferably using a colony of nitrifying bacteria maintained within bio-filter bed 276. Bio-filter bed 276 preferably comprises an enclosure having a preferred internal capacity of at least about 200 gallons. Bio-filter bed 276 preferably performs the filtration by passing water 107 through a layer of bio-filtering media 192. The preferred composition of bio-filtering media 192 is selected based on surface area available within the composition for bacterial colonization in relation to the associated physical volume (size) of the selected media. Preferred media compositions comprise both large bacteria holding surface areas and relatively compact physical size. A preferred bio-filtering media 192 comprises a chemically inert material composition, preferably plastic pellets, alternately preferably porous ceramic pellets. Upon reading this specification, those with ordinary skill in the art will now appreciate that, under appropriate circumstances, considering such issues as cost, user preference, etc., other bio-filtering arrangements such as, for example, non-woven synthetic or synthetic-coated material, preferably of the type customarily identified as "hog hair" filter media, synthetic meshing, sand and gravel within a larger-capacity filter bed, etc., may suffice. After passing through bio-filter bed 276, water 107 is preferably discharged to filter unit 278, as shown.

Filter unit 278 preferably functions to collect and remove waste particles and debris from water 107. Filter unit 278 preferably comprises a swimming pool-type sand filter having an effective filtration area of at least about six square feet and a flow rate of at least about 140 gallons per minute. Preferred sand-type swimming pool filters suitable for use as filter unit 278 include a PRO™ series sand filter model S360T2 produced by Hayward Industries, Inc. of Elizabeth, N.J.

Cleaning of filter unit 278 is preferably done by backwashing. Water 107 supplied to filter unit 278 is preferably reversed at multiport valve 294, releasing the suspended matter from the sand, which matter is preferably flushed out through discharge line 296. Backwashing is preferably done automatically, according to pressure differential or, alternately preferably, according to time. Waste water 143 generated during backwashing is preferably transferred to at least one on-site byproduct utilizer 116 via at least one discharge line 269. Waste water 143 not used by on-site byproduct utilizer 116 is preferably reclaimed and reused in one or more alternate site operations.

Depending on the species of organic aquatic livestock 103 and local climate, water 107 is preferably passed from filter 278 to at least one heater 284, as shown. For *tilapia* production, water 107 is preferably maintained between about 80 and about 86 degrees continuous temperature.

Heater 284 preferably comprises a gas-fired unit, alternately preferably a 220-volt electric unit. Alternately preferably, heater 284 comprises a solar-powered unit using heat supplied by an onsite array. Heater 284 preferably comprises an input heat capacity of about 400,000 BTU. A preferred heater unit suitable for use as heater 284 comprises 400,000 BTU H-Series gas-fired unit produced by Hayward Industries, Inc. of Elizabeth, N.J.

The discharge side of heater 284 is preferably coupled to a second bio-filter bed 296, as shown. Bio-filter bed 296 preferably functions as a secondary toxic-compound remover by promoting the oxidation of additional dissolved ammonia to nitrates, preferably using a colony of nitrifying bacteria maintained within bio-filter bed 296. Bio-filter bed 296 preferably comprises an enclosure having a preferred internal capacity of at least about 400 gallons. Bio-filter bed 296 preferably performs the filtration by passing water 107 through another layer of bio-filtering media 192. Upon reading this specification, those with ordinary skill in the art will now appreciate that, under appropriate circumstances, considering such issues as cost, user preference, etc., other bio-filtering arrangements such as, for example, non-woven synthetic or synthetic-coated material, preferably of the type customarily identified as "hog hair" filter media, synthetic meshing, sand and gravel within a larger-capacity filter bed, etc., may suffice. Bio-filter bed 296 is preferably elevated about two feet. After passing through bio-filter bed 296, water 107 is preferably discharged to grow-out enclosure 128 via inlet 272, as shown.

The preferred aerator 298 servicing grow-out enclosure 128 comprises at least one oil-free air-pump 302 structured and arranged to pump filtered air into water 107 at an elevated pressure. Air-pump 302 preferably draws air through air filter 204 and delivers the filtered air into water 107 through the in-tank bubbler 300. In-tank bubbler 300 preferably comprises four perforated plates evenly spaced along the interior of grow-out enclosure 128, preferably near the bottom of the enclosure. In-tank bubblers 300 are preferably adapted to oxygenate the controlled aquatic environment 105 by forming a dispersion of bubbles within water 107, as shown. Air-pump 302 preferably comprises a regenerative blower model VB002S produced by Spencer Turbine Company of Windsor, Conn.

Air filter 204 is preferably used to prevent the introduction of bacteria, mold spores, and similar airborne vectors into water 107 during aeration. Air filter 204 preferably comprises a Honeywell brand model F200E1037. Upon reading this specification, those with ordinary skill in the art will now appreciate that, under appropriate circumstances, considering such issues as cost, user preference, etc., other filter arrangements such as, for example, the use of inline ultraviolet disinfectors, membrane filters, etc., may suffice.

The above-noted equipment of aquatic life-support unit 120 is preferably designed to turn over water 107 in grow-out enclosure 128 about six times in each 24-hour period, with enough flow through the tank to help move debris along the bottom toward suction sparger 306.

Each grow-out enclosure 128 preferably comprises suction sparger 306 to assist in removing solid wastes from the interior of the tank. Suction sparger 306 preferably comprises a perforated pipe extending along the length of the interior of grow-out enclosure 128, as shown. Suction sparger 306 preferably comprises an external coupler 308 allowing suction sparger 306 to be coupled to a pumping vehicle (or other means for transferring waste water 143 to an on-site waste utilize).

Grow-out enclosure 128 further comprises one or more control valves 310 preferably adapted to permit the redirect on of water 107 within the system: for example, at least one control valve 310 is preferably provided to allow aquatic life-support unit 120 to draw water 107 directly from suction sparger 306, as required. In addition, grow-out enclosure 128 preferably comprises a preferred series of control valves 310, in combination with at least one water input port 312, preferably arranged to allow an input of water 107 directly from on-site well 109. This preferred arrangement provides for initial filling of the tanks as well as a means for providing emergency water circulation should aquatic life-support unit 120 require service during a production cycle.

At the completion of the preferred growth period, the matured organic aquatic livestock 103 are preferably transferred from grow-out enclosure 128 to on-site processing plant 112 for processing, as described in FIG. 1.

Figure 8:
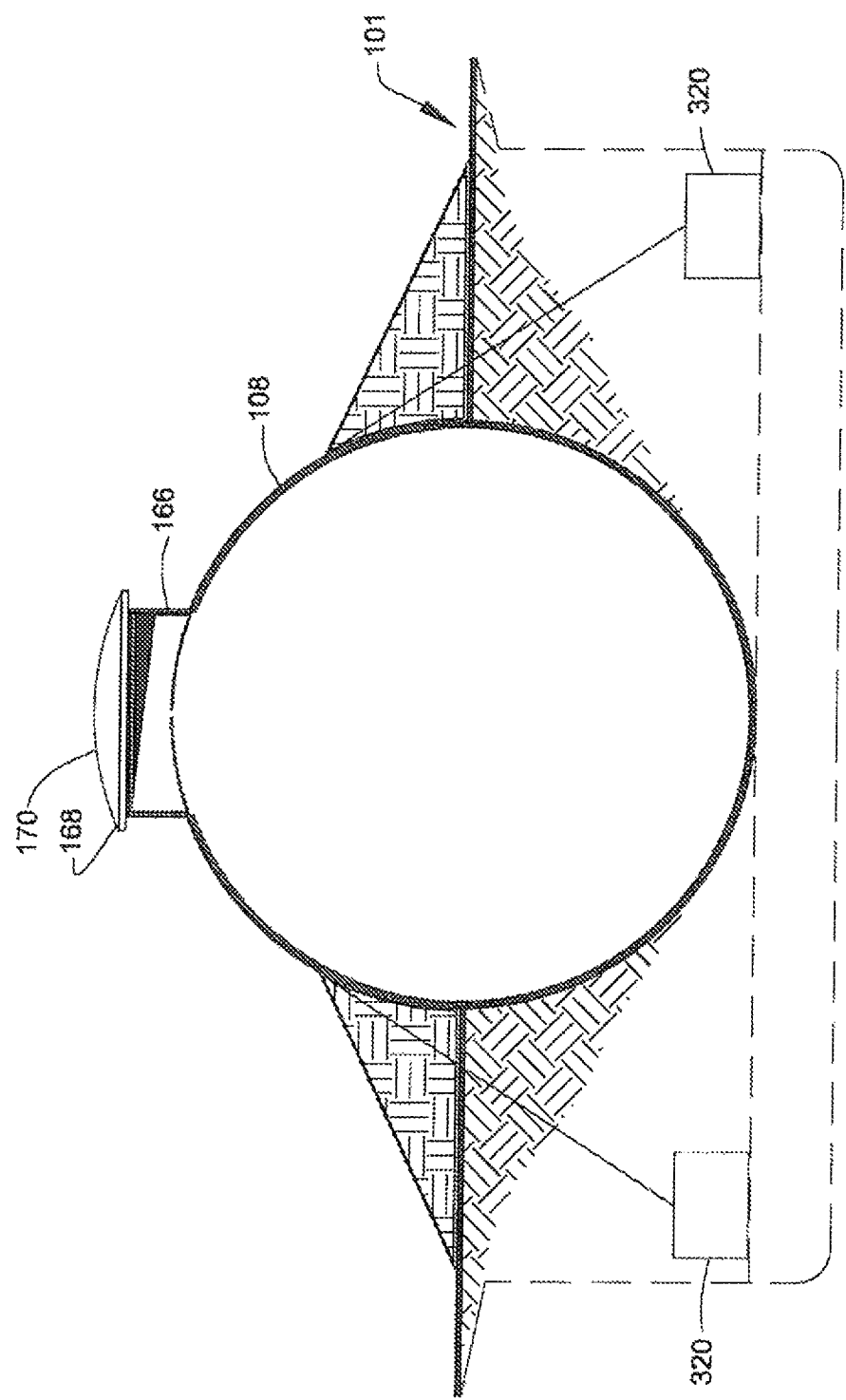
FIG. 8 shows diagrammatic sectional view illustrating preferred partial in-ground placements of an isolating enclosure according to the preferred embodiment of FIG. 1.

FIG. 8 shows a diagrammatic sectional view illustrating preferred partial in-ground placements of isolating enclosure 108 (e.g., production tank 104, and grow-out enclosure 128) according to the preferred embodiment of FIG. 1. Preferably, a substantial portion of the system, including isolating enclosure 108 (e.g., production tank 104, and grow-out enclosure 128), preferably may be placed below-ground, alternately preferably at least partially below ground. Upon reading this specification, those with ordinary skill in the art will now appreciate that, under appropriate circumstances, considering such issues as design preference, user preferences, marketing preferences, cost, structural requirements, available materials, technological advances, etc., other below-ground arrangements such as, for example, all or partial equipment/tanks below ground or partially below ground, etc., may suffice.

Installation of isolating enclosures 108 is preferably in accordance with the recommendations of the tank manufacturer. If a selected organic aquaculture production site 101 is subject to seasonal or unpredictable ground water, it is preferred that deadman anchors 320 be used to avoid possible floatation of empty tanks.

Preferred organic aquaculture production sites 101 comprises a generally flat surface terrain, preferably a rock-free terrain with accessible pollution-free water preferably through on-site well 109, with accessible electrical power, and with access to roads to support the preferred product distribution channels noted in FIG. 1. Site temperatures and moisture should be at acceptable levels (preferably avoiding excessively high or low temperatures and preferring moderate/low moisture levels).

The above-described organic aquatic-farming apparatus 102 is preferably capable of supporting the production of at ninety-seven species of fish (preferably including *tilapia*, catfish, trout, and shrimp). The system design is preferably adapted to the production of new species that may become available. Health of the product during production is protected through the preferred use of controlled aquatic environment 105 located within isolating enclosures 108. As fish are grown out in the enclosed tanks, the exposure to disease is negligible (product is not exposed to the outside environment as it is if raised in ponds, lakes and rivers) and is preferably isolated from bacterial and fungal factors during production.

Figure 9:
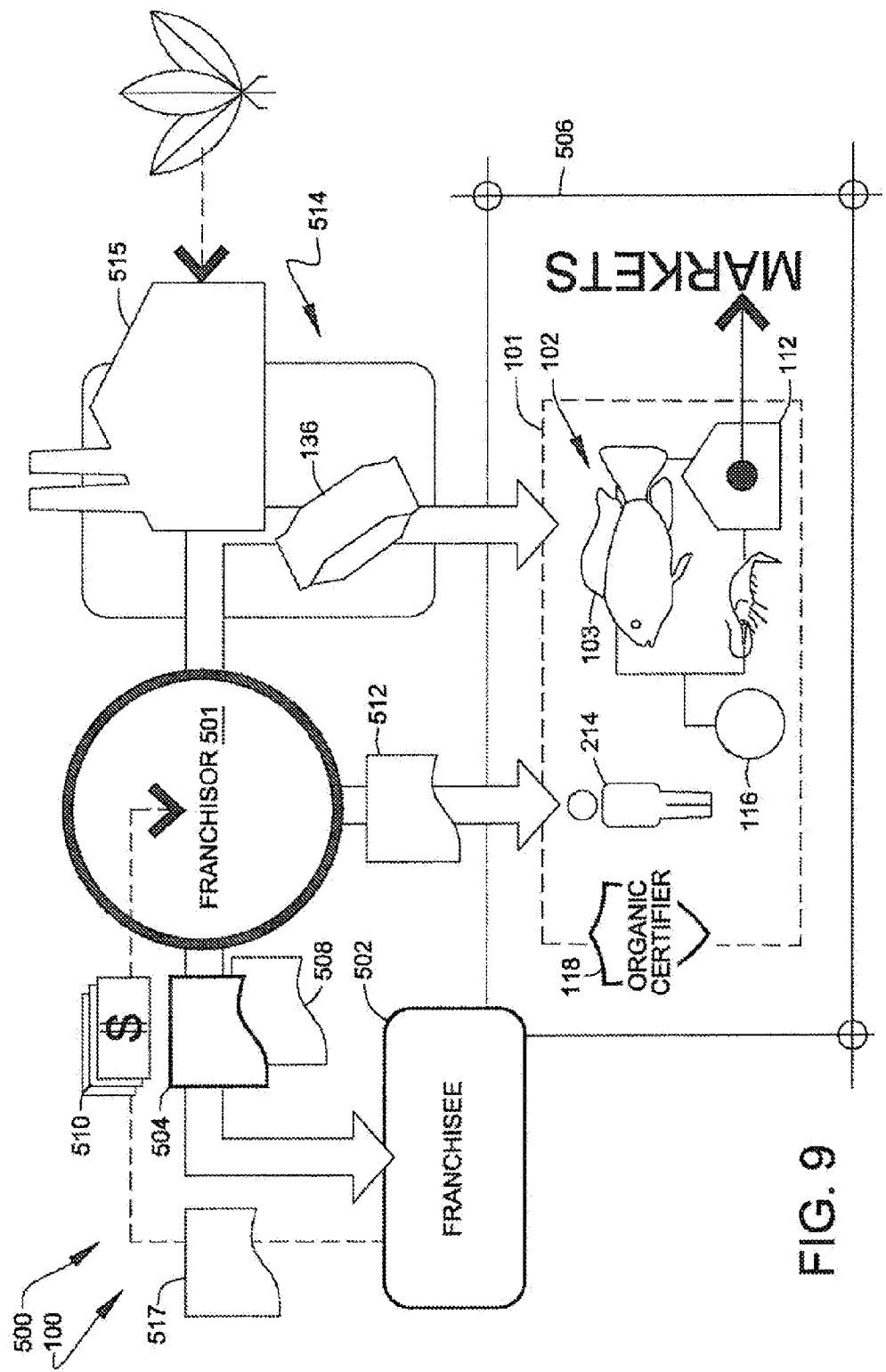
FIG. 9 shows a diagrammatic representation of a preferred method of franchising organic aquaculture production within a site, according to a preferred embodiment of the present invention.

FIG. 9 shows a diagrammatic representation of preferred method 500 of franchising organic aquaculture production within a site, according to a preferred embodiment of the present invention. As used herein, "franchising" (and "franchisor", "franchisee", etc.) is a term meant to refer generally to collaborative contractual arrangements lawful in the applicable locations and serving the general purposes and goals of the below descriptions, and may comprise any or all of patent licensing, trademark licensing, trade secret licensing, technology transfer generally, and other business arrangements contributing to the contractual collaboration of interested parties in the organic food supply chains for the described systems and products herein. According to method 500, franchisor 501 preferably grants at least one franchisee 502 a franchise 504 to operate at least one organic production unit 102 within at least one organic aquaculture production site 101, as shown. In consideration of granting such franchise 504, franchisee 502 preferably provides one or more forms of compensation 510 to franchisor 501. The preferred forms of such compensation may be payment of an initial franchise fee, repayment of site development costs, royalties from sale production products, or combinations of the aforementioned.

Franchise 504 preferably designates an assigned territory 506 in which franchisee 502 may operate. In preferred provisions of franchise 504, assigned territory 506 preferably defines a geographic region in which franchisee 502 may distribute organic products produced by the operation of one or more organic aquaculture production sites 101. In the United States, assigned territory 506 is preferably defined by state boundary divisions. Although not specifically prohibited by the preferred arrangements of franchise 504, organic aquaculture production site 101 is preferably established within the geographical boundary of assigned territory 506. This organizational preference facilitates efficient product distribution to markets designated by franchise 504 to be assigned to and controlled by franchisee 502.

Under the preferred arrangements of franchise 504, franchisor 501 assists franchisee 502 in the selection of at least one organic aquaculture production site 101 within the assigned territory 506. Such assistance preferably comprises an evaluation of multiple potential development sites, preferably using a set of selection criteria 508 developed by franchisor 501. Using knowledge of the project and its requirements, technical factors, and financial factors, franchisor 501 preferably produces a "shortlist" of potential sites, from which franchisee 502 preferably selects organic aquaculture production site 101. Alternately preferably, franchisee 502 generates the initial list of potential sites to submit franchisor 501 for review. Selection criteria 508 preferably include required buildable site area, zoning compliance, presence of a suitable (flat and rock-free) topography, accessible water supply (preferably supplied by an on-site groundwater well), accessible electrical power, access to one or more maintained transportation routes, and land acquisition costs. Additional preferred selection criteria may include proximity to commercial markets, site environmental impact, hydrology (watersheds, wetlands, flood-plains, surface drainage), seismic risks, future expansion capability, and local economic development incentives.

Upon reading this specification, those with ordinary skill in the art will now appreciate that, under appropriate circumstances considering such issues as local regulations, franchisor preference, etc., other site acquisition arrangements such as, for example, franchisor pre-selection of a specific development site on behalf of potential franchisees, franchisor pre-selection and purchase or lease of a development site, leasing of a franchisor-owned site to a franchisee, entering into a lease-purchase transfer of a franchisor-owned site to a franchisee, etc., may suffice.

Under the preferred covenants and agreements of franchise 504, on acquisition of organic aquaculture production site 101, franchisor 501 preferably assists in the development of at least one organic production unit 102 within the selected organic aquaculture production site 101. Such development assistance preferably includes establishment at least one pollutant-free water supply, installation of necessary items of production equipment, establishment of secondary on-site production (biofuel, fertilizer, surface crop), using waste streams from primary production and development of one or more electrical power sources. Franchisee 502 is preferably responsible for initial capital costs, which may be structured within or apart from the above-described compensations to franchisor 501.

An alternate preferred provision of franchise 504 preferably addresses the establishment of on-site product processing, preferably in the form of assistance by franchisor 501 in the development of on-site processing plant 112. Thus, under a preferred set of covenants and agreements of franchise 504, franchisor 501 provides essentially a "turnkey" operation. Upon reading this specification, those with ordinary skill in the art will now appreciate that, under appropriate circumstances, considering such issues as franchise cost, franchisor preference, franchisee preference, etc., other franchise terms and provisions such as, for example, establishment by the franchisor of off-site shipping and transportation on behalf of the franchisee, establishment by the franchisor of a product buyer relationship with the franchisee, requiring the franchisee to independently develop the organic production units, etc., may suffice.

Under the preferred terms of franchise 504, franchisor 501 provides to franchisee 502 training and support in the form of at least one training program 512, preferably directed to one or more individuals designated by the franchisee. Training program 512 preferably presents preferred operating protocols detailing how the franchisee will operated the organic aquaculture production site 101 in compliance with franchise 504. Training program 512 is preferably designed to promote the development of at least one site manager 214, who is then able to provide subsequent training to secondary support personnel. Such training is preferably done at the organic aquaculture production site 101, alternately preferably at a corporate headquarters, or a combination of both. Upon reading this specification, those with ordinary skill in the art will now appreciate that, under appropriate circumstances, considering such issues as franchise cost, franchisor/franchisee preferences, etc., other training arrangements such as, for example, establishing a means for providing ongoing training including administrative and technical support, etc., may suffice.

Training program 512 most preferably takes place at the organic aquaculture production site 101 using an initial startup of production as a practical training tool. Thus, designated trainees of franchisee 502 work with one or more trainers to complete initial establishing of the plurality of controlled aquatic environments, setup of required testing and monitoring, generating the fry population and monosex production population, etc. Such training may be assisted through the use of one or more handbooks, manuals, other written materials (preferably including materials distributed electronically), and video, audio and/or software media.

It is further noted that alternate preferred embodiments of training program 512 preferably encompass an expanded range of franchise-controlled operations, preferably including preferred management of secondary aquatic-product production 130, preferred operation and management of on-site byproduct utilizers 116, preferred operation and management of on-site processing plant 112, preferred interactions with organic certification entity 118 (e.g., assistance in establishing certification monitoring by entity providing organic certification of such organic products), etc.

Preferred operating protocols of franchise 504 establish strict guidelines on all inputs to the controlled aquatic environments 105, preferably including the type and source of feed rations used during production. Within the duration of the franchise 504, franchisee 502 is preferably provided access to at least one supply purchase program 514 supplying approved organic feed 1.36 to be used during production. Franchisee 502 preferably commits to use only the approved organic feed 136 and to acquire feed 136 solely through supply purchase program 514. Supply purchase program 514 is preferably administered within a network of organic feed suppliers, preferably comprising one or more manufactures 515 of the approved organic feed 136. In a preferred arrangement of method 500, franchisor 501 oversees supply purchase program 514, preferably acting as an owner/operator of network of organic feed suppliers. Alternately preferably, the network of organic feed suppliers operates under licenses issued by franchisor 501. In yet another alternate preferred arrangement, franchisor 501 forms the network through a separate organic feed franchising program.

Within the preferred covenants and agreements of franchise 504, franchisee 502 is responsible for the costs associated with ongoing production, preferably including maintenance, employee wages, insurance, advertising, site utilities, taxes, etc. Within the preferred covenants and agreements of franchise 504, franchisee 502 preferably provides regular reports 517 to franchisor 501, preferably including financial reporting of total revenues derived by franchisee 502 along with the results of monitoring and testing.

Figure 10:
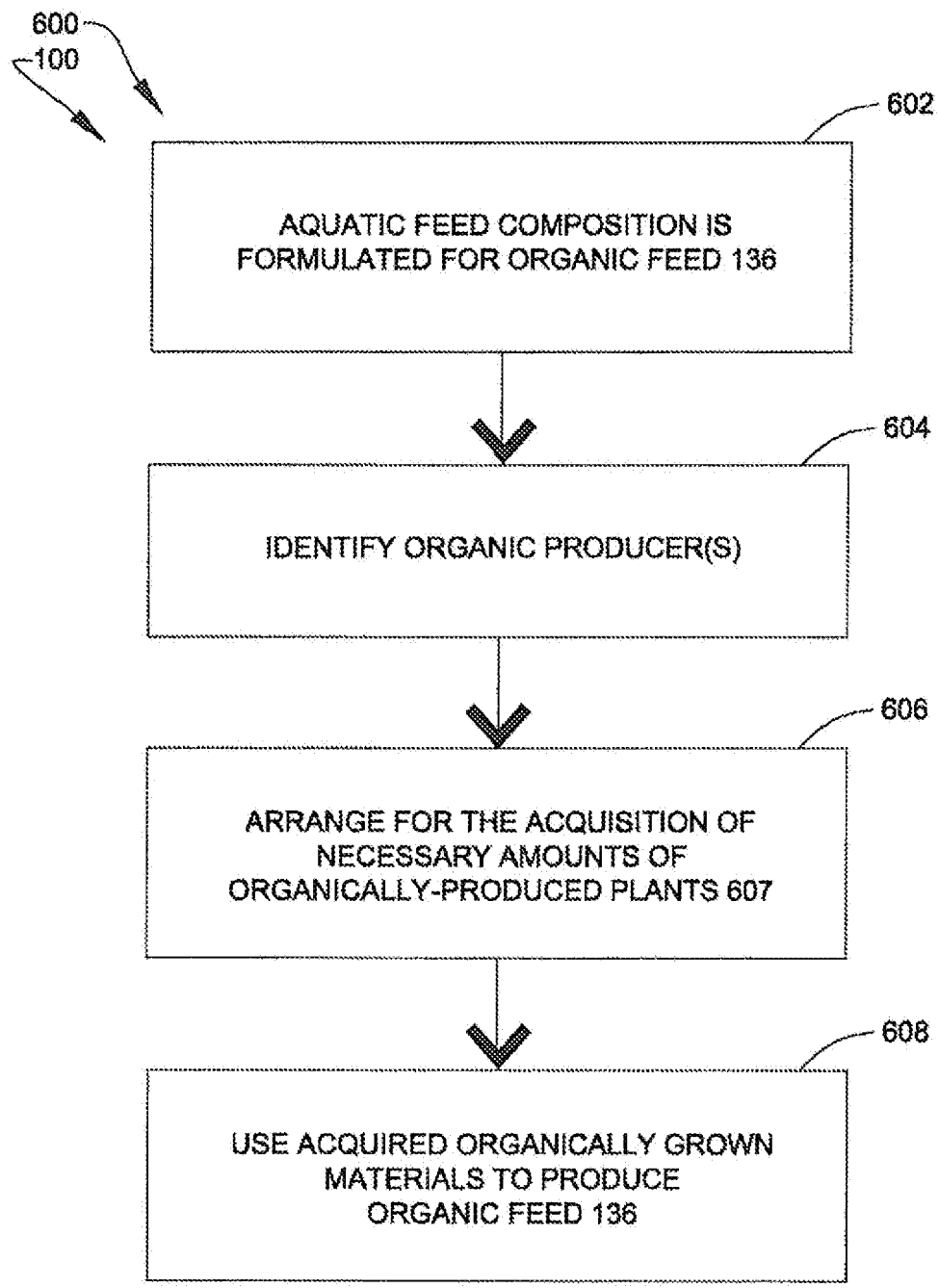
FIG. 10 shows a flow diagram illustrating a preferred method of producing organic feed products, according to a preferred embodiment of the present invention.

FIG. 10 shows a schematic flow diagram illustrating a method 600 related to production of the approved organic feed 136 distributed by network of organic feed suppliers described in FIG. 9. As noted above, such feed 136 is usable in the organic farming of organic aquatic livestock 103.

In initial preferred step 602 of method 600, at least one aquatic feed composition is preferably formulated for the production of feed 136. Preferred formulations comprise plant-based proteins derived only from organically-produced plants, and are preferably designed to meet the nutritional requirements of organic aquatic livestock 103 without the use of protein from fish meal or similar animal based by-products. Applicant has determined that such plant-based compositions are highly effective in the healthy production of *Tilapia*. Upon reading this specification, those with ordinary skill in the art will now appreciate that, under appropriate circumstances, considering such issues as cost, user preference, etc., other protein sources such as, for example, utilizing fish meal and oil from carcasses, viscera, and trimmings from the processing of foreign certified organic farmed aquatic animals, etc., may suffice.

In subsequent preferred step 604, at least one organic producer producing such organically-produced plant material is identified by the manufacturer of the approved organic feed 136. Such organic producer preferably comprises one or more organic farm producers, most preferably organic farm producers operating under in compliance with the organic certification requirements of organic certification entity 118.

In subsequent preferred step 606, the manufacturer of the approved organic feed 136 (preferably comprising at least one member of the network of organic feed suppliers) preferably arranges for the acquisition of necessary amounts of organically-produced plants 607 (see FIG. 9) from the organic producer or producers. In subsequent preferred step 608, the manufacturer of the organic feed 136 uses the acquired organically grown materials to produce the above-described organic feed 136 (at least embodying herein such aquatic feed comprising such at least one aquatic feed composition using such plant-based proteins derived from such at least one organically-produced plant). The resulting organic feed 136 is then preferably made available to franchisees 502 via the network of organic feed suppliers.

Figure 11:
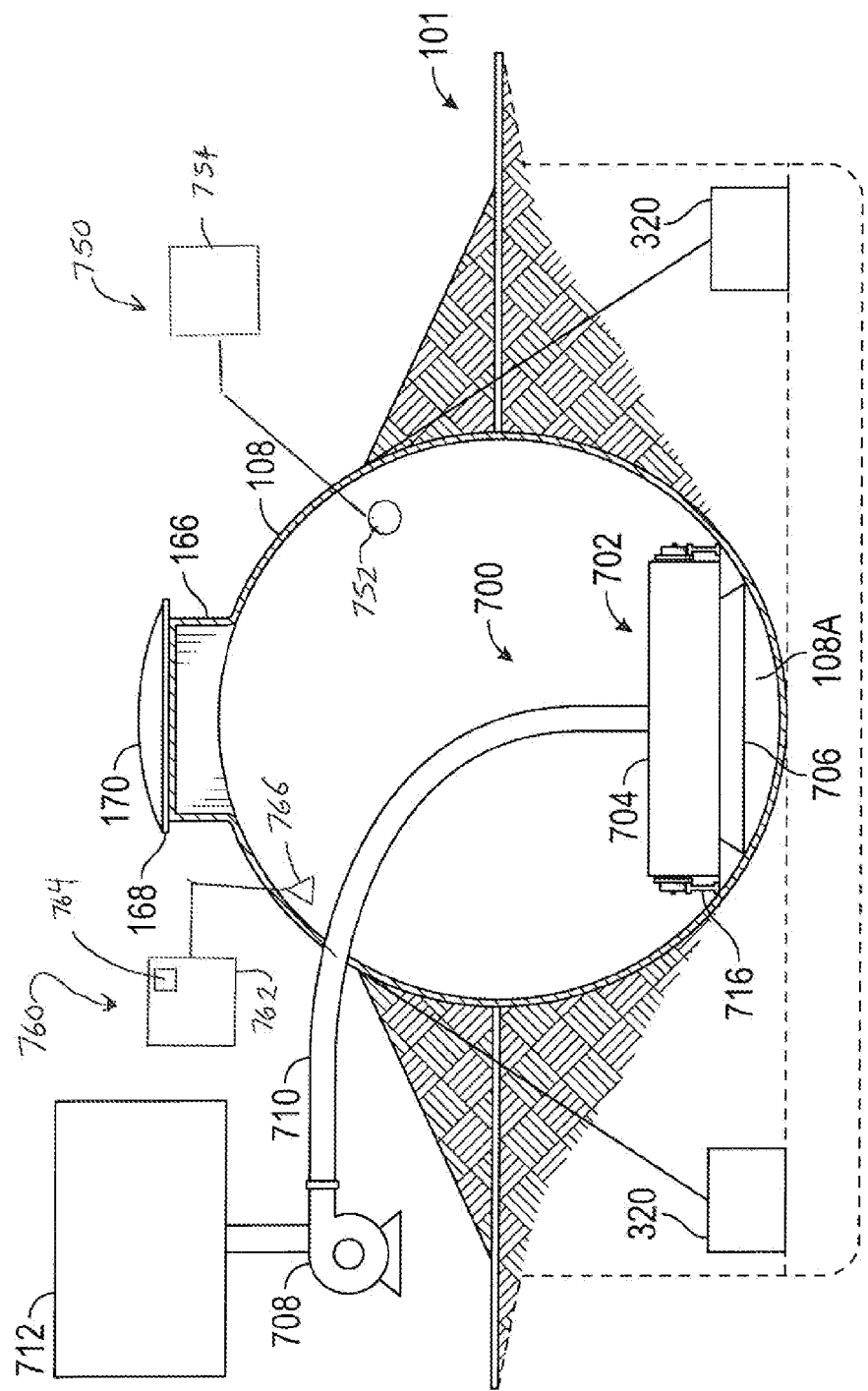
FIG. 11 is a diagrammatic sectional view illustrating preferred partial in-ground placements of an isolating enclosure according to the preferred embodiment of FIG. 1 with a cleaning system installed.
Figure 12:
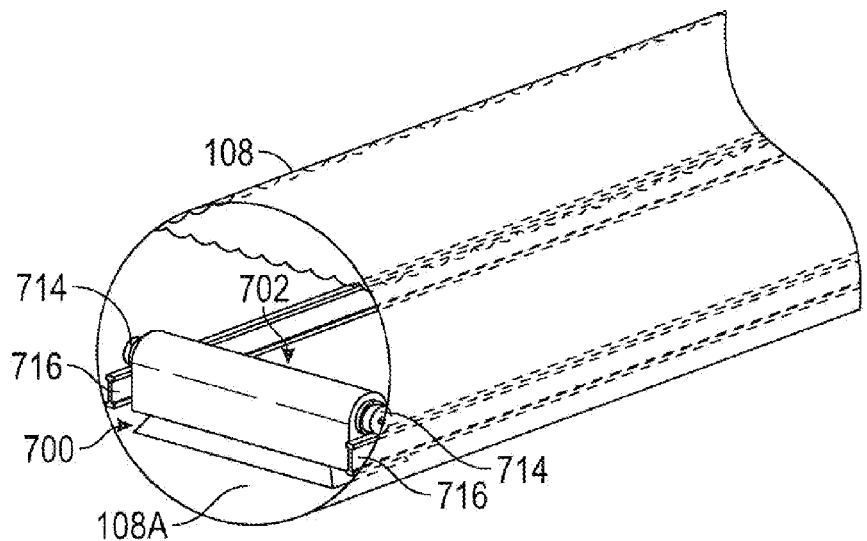
FIG. 12 is a perspective view of the isolating enclosure with the cleaning system as shown in FIG. 11.

Referring now to FIGS. 11-12, a cleaning system 700 for the isolating enclosure 108 may be seen. The cleaning system 700 may be used to remove waste, food and other debris from the isolating enclosure 108. The removal of waste, food and other debris may be important in order to eliminate the possibility of excessive ammonia levels in the isolating enclosure 108. Decomposition of organic matter in the isolating enclosure 108 may be a main route through which ammonia can enter the isolating enclosure 108. Proteins are highly abundant in all living organisms. These proteins may be made up of soluble building blocks called amino acids. Each amino acid contains an amino group that consists of NH2. So the breakdown of proteins inevitably leads to the release of ammonia into the water.

Due to the rounded configuration of the isolating enclosure 108, the waste, food and other debris should all fall and collect in a bottom segment area 108A of the isolating enclosure 108. The cleaning system 700 may then be used to remove the remove waste, food and other debris that may be located on the bottom segment 108A of the isolating enclosure 108.

In accordance with one embodiment, the cleaning system 700 may be an automated system. Thus, the cleaning system 700 may be designed to automatically remove the waste, food and other debris that may be located on the bottom segment 108A of the isolating enclosure 108 at designated time intervals.

The cleaning system 700 may have a vacuum unit 702. The vacuum unit 702 may have a housing 704. The housing 704 may have an inlet section 706. The inlet section 706 may be configured to run a length of the bottom segment 108A of the isolating enclosure 108. The inlet section 706 may be coupled to a pumping unit 708. The pumping unit 708 may be used to draw the waste, food and other debris, as well as water, that may be located on the bottom segment 108A of the isolating enclosure 108 into the inlet section 706 and out of the isolating enclosure 108 and into a tank 712 or other storage unit. The pumping unit 708 may be located within the housing 704. Alternatively, the pumping unit 708 may be located external to the housing 704 and coupled to the housing via tubing 710 or the like.

The water, waste, food and other debris collected may be stored in the tank 712 or other storage unit. The mixture of the water and waste, food and other debris collected may be used as a liquid fertilizer. Thus, the tank 712 and its content may be sold to agriculture establishments in the need of liquid fertilizer. Alternatively, the contents in the tank 712 may be bottled and sold as a liquid fertilizer to those in need of such products.

A drive system 714 may be coupled to the housing 704. The drive system 714 may be used to move the vacuum unit 702 along the bottom segment area 108A of the isolating enclosure 108. As stated above, the vacuum unit 702 may be automated. Thus, the drive system 714 may be programmed to move the vacuum unit 702 along the bottom segment 108A of the isolating enclosure 108 to remove the waste, food and other debris. The drive system 714 may be programmed to move the vacuum unit 702 in a predetermined pattern, at designated times, or the like. The above listing of programmable features is given as an example and should not be seen in a limiting manner.

The cleaning system 700 may have a pair of track members 716. The track members 716 may be used to guide the vacuum unit 702 along the bottom segment 108A of the isolating enclosure 108. In accordance with one embodiment, one of the track members 716 may be coupled to each end of the bottom segment 108A of the isolating enclosure 108. The drive system 714 of the vacuum unit 702 may be coupled to the track members 716. Thus, wheels 714A of the drive system 714 may be coupled to the track members 716. This may allow the vacuum unit 702 to move along the track members 716 so that the vacuum unit 702 may clean the bottom segment 108A of the isolating enclosure 108.

As shown in FIG. 11, a sensor system 750 for the isolating enclosure 108 may be seen. The sensor system 750 may have a sensing unit 752. The sensing unit 752 may be used to monitor different operating conditions within the isolating enclosure 108. The sensing unit 752 may be comprises of a plurality of different sensors wherein each sensor may be configured to monitor a specific operating condition. For example, the sensing unit 752 may have sensors to monitor oxygen ($O_2$) levels, ammonia levels, water level, pH level or acidity level, nitrates, and the like. The above listing is given as an example and should not be seen in a limiting manner. The sensing unit 752 may be coupled to a monitoring device 754. The monitoring device 754 may be used to record the readings from the sensing unit 752. The monitoring device 754 may further be used to display the different readings from the sensing unit 752. The monitoring device 754 may further be able to transmit the different readings from the sensing unit 752 to a remote device and or location.

The isolating enclosure 108 may further have an automated feed system 760. The automated feed system 760 may be used to supply feed to the organic aquatic livestock 103. The automated feed system 760 may be configured to supply feed at predetermined intervals. For example, the automated feed system 760 may be programmable such that a person may set the automated feed system 760 to dispense a predetermined amount of feed at predetermined intervals. For example, the automated feed system 760 may be programmed to dispense a predetermined amount of feed every 4 hours. Alternatively, the automated feed system 760 may be configured to adjust the amount of feed dispended at predetermined intervals based on the amount of organic aquatic livestock 103 stored and or monitored in the isolating enclosure 108.

The automated feed system 760 may be comprised of a feed tank 762. The feed tank 762 may be used to store the feed. The feed tank 762 may have a programmable unit 764. The programmable unit 764 may be used to allow a user to select an amount of feed to be dispensed as well as how often the fee will be dispensed. The feed tank 762 may be coupled to a distribution device 766. The distribution device 766 may be used to distribute the feed in the isolating enclosure 108.

Figure 13:
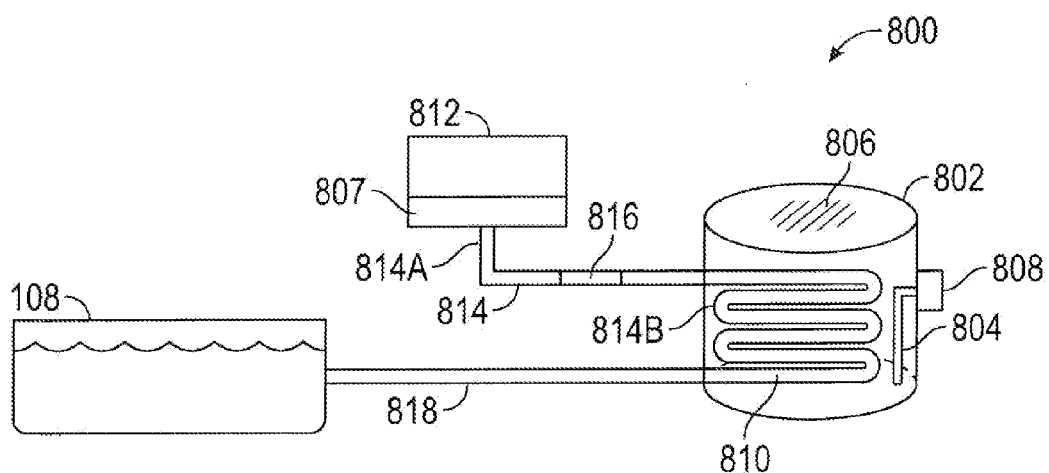
FIG. 13 is a simplified block diagram of a heating system for the isolating enclosure.

Referring now to FIG. 13, a heating system 800 for the isolating enclosure 108 may be seen. In the past, heating devices for fish tanks and the like generally consisted of resistive heating devices immersed in the tank and controlled by a thermocouple control likewise immersed in the liquid. This arrangement has proved both expensive and inefficient.

The heating system 800 may operate by heating air which may then be injected into the isolating enclosure 108 as opposed to heating the water in the tank holding the fish as in the prior art. The heating system 800 may use a storage unit 802. The storage unit 802 may house a heating element 804. The heating element 804 which may be used for heating a liquid 806 stored within the storage unit 802. In accordance with one embodiment, the liquid in the storage unit 802 may be water. In accordance with another embodiment, the storage unit 802 may be a 50 gallon drum. The 50 gallon drum may be formed or plastic or other material.

A thermostat 808 may be coupled to the heating element 804. The thermostat may be used to control the heating temperature of the heating element 804.

Tubing 810 may be positioned within the storage unit 802 such that the liquid 806 within the storage unit 802 surrounds the tubing 810. The tubing 810 may be coiled within the storage unit 802. In accordance with one embodiment, the tubing may be metal piping, plastic piping, plastic tubing or the like. The above listing is given as an example and should not be seen in a limiting manner.

The heating system 800 may further have an air pump 812. The air pump 812 may be used for providing an air and or oxygen source. The air pump 812 may have a filter system 814. The filter system 807 may be used to remove any particulates and purify the air and or oxygen exiting the air pump 812.

A supply line 814 may have a first end 814A coupled to an exit of the air pump 812 and a second end 814B coupled to a first end 810A of the tubing 810. The supply line 814 maybe used to move the air and or oxygen exiting the air pump 812 to the tubing 810. An Ultraviolet germicidal irradiation (UVGI) device 816 may be coupled to or form part of the supply line 814. The UVGI device 816 is a device that uses ultraviolet (UV) light at sufficiently short wavelength to kill bacteria and other microorganisms.

The air and or oxygen moves through the supply line 814 and through the tubing 810. The heated liquid 806 in the storage unit 802 heats the air and or oxygen in the tubing 810. The heated air and or oxygen may then be sent to the isolating enclosure 108. In accordance with one embodiment, the heated air and or oxygen sent to the isolating enclosure 108 may be sent via tubing 818. The tubing 818 may inject the air and or oxygen into the water stored within the isolating enclosure 108. The heated air and or oxygen injected into the water serves two functions. First, the heated air and or oxygen injected into the water supplies oxygen to the fish in the isolating enclosure 108. Thus, the tubing 818 may act as a bubbler system. Second, the heated air and or oxygen sent may also warm the water within the isolating enclosure 108. Thus, the need for expensive heating elements for the isolating enclosure 108 is generally not required.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system for organic farming of aquatic livestock, comprising:
   at least one substantially enclosed container structured and arranged to contain at least one input-controlled organic environment usable to organically farm such aquatic livestock, wherein said at least one substantially enclosed container comprises at least one environmental isolator structured and arranged to substantially isolate at least one volume of such water from a surrounding terrestrial environment;
   at least one pollutant-free water-supplier structured and arranged to supply, to said at least one substantially enclosed container, water substantially free of environmental pollutants;
   at least one aquatic life-support unit structured and arranged to maintain within said at least one substantially enclosed container habitable environment consistent with sustaining growth of such aquatic livestock;
   at least one gas exhauster structured and arranged to exhaust, from said at least one substantially enclosed container, gases discharged into an airspace from such water contained therein;
   at least one heating system coupled to said at least one substantially enclosed container, said at least one heating system heating an air mixture, said air mixture injected into said water substantially free of environmental pollutants to heat said water substantially free of environmental pollutants; and
   an automated vacuum system coupled to a bottom section of said at least one substantially enclosed container.

2. The system for organic farming of aquatic livestock in accordance with claim 1, further comprising a sensor system coupled to said at least one substantially enclosed container to monitor operating conditions of said at least one substantially enclosed container.

3. The system for organic farming of aquatic livestock in accordance with claim 2, wherein said sensor system transmits said operating conditions to a remote location.

4. The system for organic farming of aquatic livestock in accordance with claim 1, further comprising an automated feed system coupled to said at least one substantially enclosed container.

5. The system for organic farming of aquatic livestock in accordance with claim 1, wherein said at least one heating system comprises:
   an air pump for generating an air mixture;
   a heating device for warming said air mixture; and
   a first tubing for transferring and injecting said air mixture that has been warmed into said water substantially free of environmental pollutants.

6. The system for organic farming of aquatic livestock in accordance with claim 1, wherein said automated vacuum system comprises:
   a vacuum unit; and
   a pair of tracks placed on a bottom segment area of said at least one substantially enclosed container, said vacuum unit riding on said pair of tracks.

7. A system for organic farming of aquatic livestock comprising:
   at least one substantially enclosed container structured and arranged to contain at least one input-controlled organic environment usable to organically farm such aquatic livestock;
   at least one pollutant-free water-supplier structured and arranged to supply, to said at least one substantially enclosed container, water substantially free of environmental pollutants;
   at least one aquatic life-support unit structured and arranged to maintain within said at least one substantially enclosed container habitable environment consistent with sustaining growth of such aquatic livestock;
   at least one gas exhauster structured and arranged to exhaust, from said at least one substantially enclosed container, gases discharged into an airspace from such water contained therein; and
   at least one heating system coupled to said at least one substantially enclosed container, said at least one heating system heating an air mixture, said air mixture injected into said water substantially free of environmental pollutants to heat said water substantially free of environmental pollutants;
   wherein said at least one aquatic life-support unit comprises:
      at least one aerator structured and arranged to aerate water within said at least one substantially enclosed container, and
      at least one toxic-compound remover structured and arranged to remove at least one toxic compound from such water;
   wherein said at least one substantially enclosed container comprises at least one environmental isolator structured and arranged to substantially isolate at least one volume of such water from a surrounding terrestrial environment.

8. The system for organic farming of aquatic livestock in accordance with claim 7, further comprising an automated vacuum system coupled to a bottom section of said at least one substantially enclosed container.

* * * * *